United States Patent
Tseng

(10) Patent No.: US 12,550,106 B1
(45) Date of Patent: Feb. 10, 2026

(54) METHOD AND APPARATUS OF HANDLING OF SCHEDULING REQUEST TRIGGERED BY SL-PRS (SIDELINK POSITIONING REFERENCE SIGNAL) RESOURCE REQUEST IN A WIRELESS COMMUNICATION SYSTEM

(71) Applicant: ASUS Technology Licensing Inc., Taipei (TW)

(72) Inventor: Li-Chih Tseng, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/291,678

(22) Filed: Aug. 6, 2025

Related U.S. Application Data

(60) Provisional application No. 63/680,782, filed on Aug. 8, 2024.

(51) Int. Cl.
*H04W 64/00* (2009.01)
*H04W 72/21* (2023.01)
*H04W 72/25* (2023.01)

(52) U.S. Cl.
CPC .......... *H04W 64/00* (2013.01); *H04W 72/21* (2023.01); *H04W 72/25* (2023.01)

(58) Field of Classification Search
CPC ... H04L 5/0048; H04L 5/0051; H04L 5/0064; H04L 1/1812; H04L 5/001; H04L 5/0053;
(Continued)

(56) References Cited

U.S. PATENT DOCUMENTS 11,616,629 B2 * 3/2023 Kim ...................... H04W 76/14
 370/329
11,659,590 B2 * 5/2023 Kang .................. H04W 52/367
 370/329

(Continued)

FOREIGN PATENT DOCUMENTS

WO 2024069584 A1 4/2024
WO 2024207975 A1 10/2024

OTHER PUBLICATIONS

Moderator (Qualcomm): "Moderator Summary #1 on Resource Allocation for SL PRS", 3GPP TSG RAN WGI #112, R1-23XXXXX, Athens, Greece, Feb. 27-Mar. 3, 2023, 57 pages.

(Continued)

*Primary Examiner* — Matthew C Sams
(74) *Attorney, Agent, or Firm* — Cooper Legal Group LLC

(57) ABSTRACT

A method and apparatus are disclosed. In an example from the perspective of a first User Equipment (UE), the first UE determines a first priority value associated with a first Sidelink (SL) transmission to a second UE. The first UE determines a second priority value associated with a Scheduling Request (SR) transmission to a network node based upon one or more priority values associated with one or more second SL transmissions associated with a SL resource request based upon which the SR transmission is triggered. The first UE selects, from among a plurality of transmissions including the first SL transmission and the SR transmission, one of the first SL transmission or the SR transmission based upon the first priority value and the second priority value. The first UE performs the selected transmission.

20 Claims, 10 Drawing Sheets

(58) Field of Classification Search
CPC ... H04L 5/0055; H04L 1/1822; H04L 1/1854; H04L 1/1861; H04L 1/1893; H04L 1/1896; H04L 27/26025; H04L 27/2607; H04L 27/2613; H04L 27/2647; H04L 5/0023; H04L 5/0082; H04L 5/0091; H04L 5/0092; H04L 5/06; H04W 72/569; H04W 72/02; H04W 52/281; H04W 52/34; H04W 52/383; H04W 72/25; H04W 72/40; H04W 76/14; H04W 52/146; H04W 52/367; H04W 64/00; H04W 72/0446; H04W 72/20; H04W 72/21; H04W 72/23; H04W 72/232; H04W 76/23; H04W 92/18; H04W 4/02; H04W 4/023; H04W 4/025; H04W 4/40; H04W 4/70; H04W 56/0015; H04W 72/1263; H04W 72/1273; H04W 72/56; H04W 74/004; G01S 5/0205; G01S 5/0215

See application file for complete search history.

(56) References Cited

U.S. PATENT DOCUMENTS

| | | | |
|---|---|---|---|
| 12,389,432 B1 * | 8/2025 | Li | H04W 72/40 |
| 2019/0230618 A1 * | 7/2019 | Saur | H04W 56/001 |
| 2021/0045138 A1 * | 2/2021 | Kang | H04W 52/281 |
| 2021/0105790 A1 * | 4/2021 | Lin | H04W 72/56 |
| 2023/0011318 A1 * | 1/2023 | Wang | H04W 72/23 |
| 2023/0011514 A1 * | 1/2023 | Wang | H04W 72/569 |
| 2024/0113837 A1 * | 4/2024 | Hosseini | H04L 5/0053 |
| 2024/0349228 A1 * | 10/2024 | Wang | H04W 72/25 |
| 2025/0141626 A1 * | 5/2025 | Li | H04L 5/0051 |
| 2025/0240139 A1 * | 7/2025 | Vassilovski | H04L 5/0051 |

OTHER PUBLICATIONS

Moderator (Qualcomm): "Moderator Summary #2 on Resource Allocation for SL PRS", 3GPP TSG RAN WG1 #114, R1-2308471, Toulouse, France, Aug. 21-Aug. 25, 2023, 99 pages.

* cited by examiner

FIG. 6

METHOD AND APPARATUS OF HANDLING OF SCHEDULING REQUEST TRIGGERED BY SL-PRS (SIDELINK POSITIONING REFERENCE SIGNAL) RESOURCE REQUEST IN A WIRELESS COMMUNICATION SYSTEM

CROSS-REFERENCE TO RELATED APPLICATIONS

The present Application claims the benefit of U.S. Provisional Patent Application Ser. No. 63/680,782 filed on Aug. 8, 2024, the entire disclosure of which is incorporated herein in its entirety by reference.

FIELD

This disclosure generally relates to wireless communication networks, and more particularly, to a method and apparatus of handling of scheduling request triggered by Sidelink Positioning Reference Signal (SL-PRS) Resource Request in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first User Equipment (UE), the first UE determines a first priority value associated with a Sidelink (SL) transmission to a second UE. The first UE determines a second priority value associated with a Scheduling Request (SR) transmission to a network node based upon one or more priority values associated with one or more Sidelink Positioning Reference Signal (SL-PRS) transmissions associated with a SL-PRS resource request based upon which the SR transmission is triggered. The first UE selects, from among a plurality of transmissions comprising the SL transmission and the SR transmission, one of the SL transmission or the SR transmission based upon the first priority value and the second priority value. The first UE performs the selected transmission.

In an example from the perspective of a first UE, the first UE determines a first priority value associated with a first SL transmission to a second UE. The first UE determines a second priority value associated with a SR transmission to a network node based upon one or more priority values associated with one or more second SL transmissions associated with a SL resource request based upon which the SR transmission is triggered. The first UE selects, from among a plurality of transmissions comprising the first SL transmission and the SR transmission, one of the first SL transmission or the SR transmission based upon the first priority value and the second priority value. The first UE performs the selected transmission.

In an example from the perspective of a first UE not able to perform a SR transmission triggered by a SL-PRS resource request concurrently with a SL transmission associated with a first priority value, the first UE determines a second priority value associated with the SR transmission based upon a lowest priority value of priority values indicated by a SL-PRS Resource Request MAC CE for one or more pending SL-PRS transmissions. The first UE performs the SL transmission to a second UE based upon the first priority value being lower than the second priority value or performs the SR transmission to a network node based upon the second priority value being lower than the first priority value.

BRIEF DESCRIPTION OF THE DRAWINGS

FIG. 6 illustrates a Sidelink Positioning Reference Signal (SL-PRS) resource request MAC CE, according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321 V 18.2.0 (2024 June), "3GPP TSG RAN; Medium Access Control (MAC) protocol specification (Release 18)". The standards and documents listed above are hereby expressly incorporated by reference in their entirety.

Figure 1:
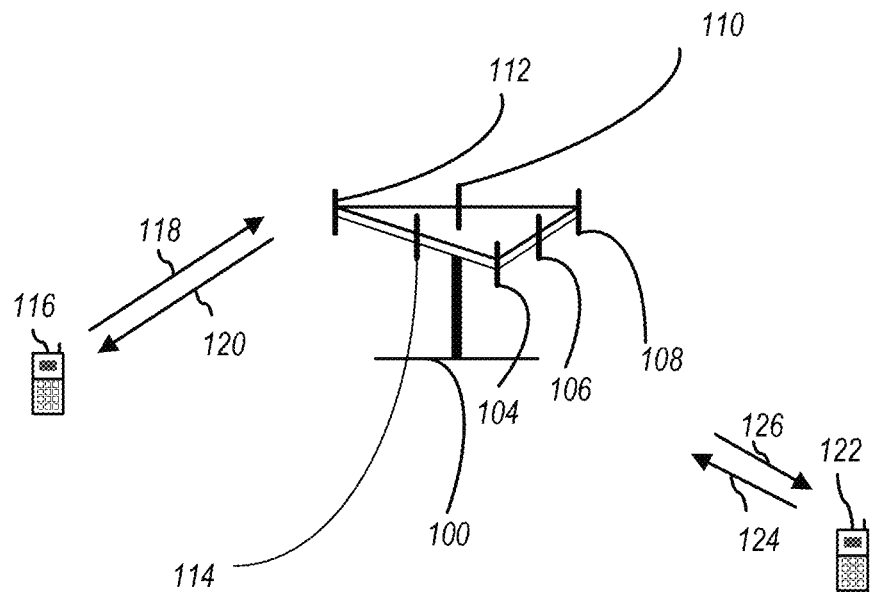
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
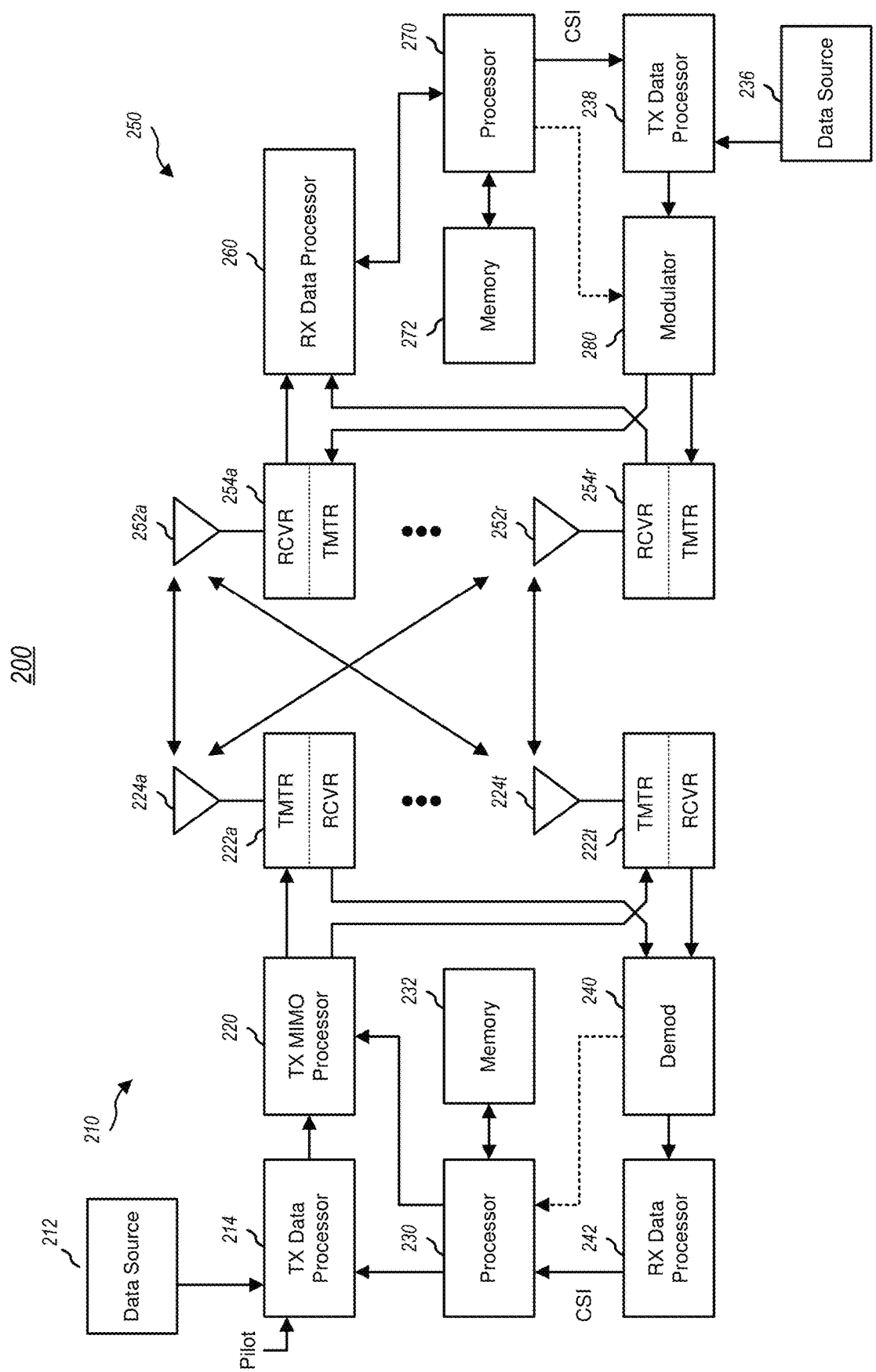
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
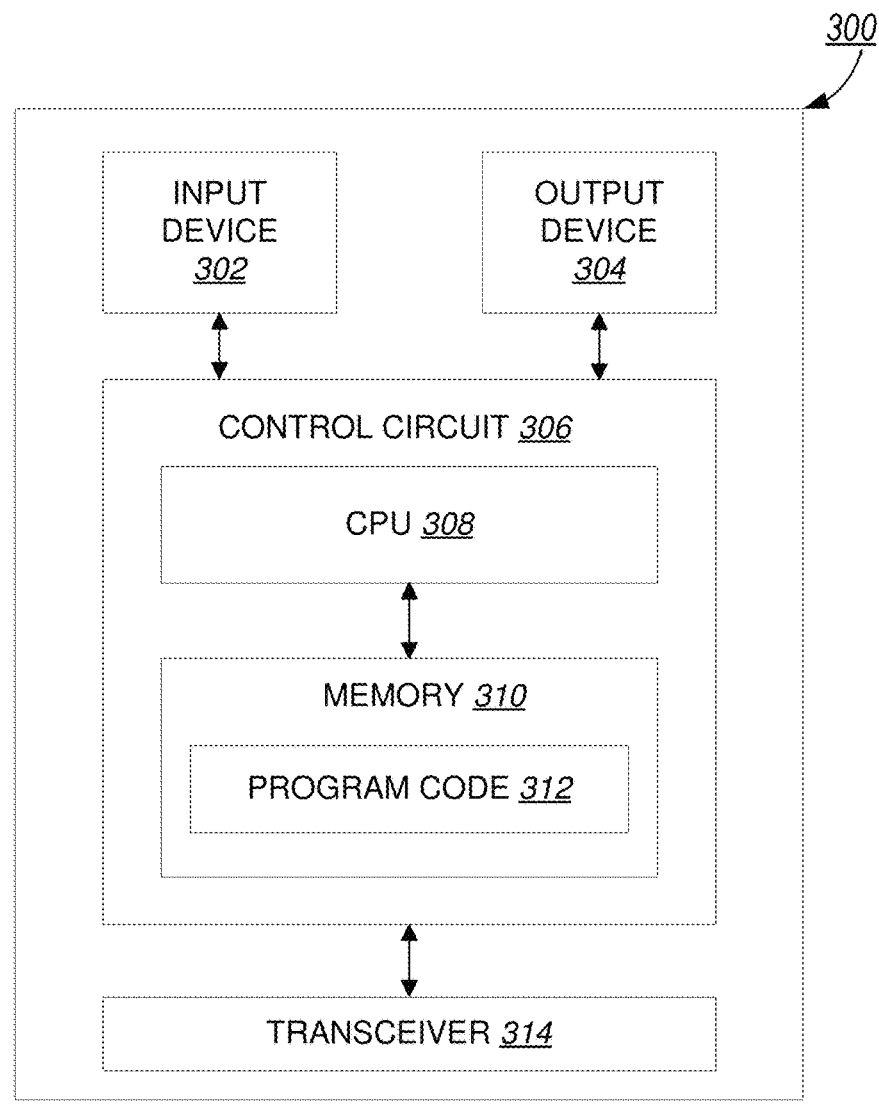
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
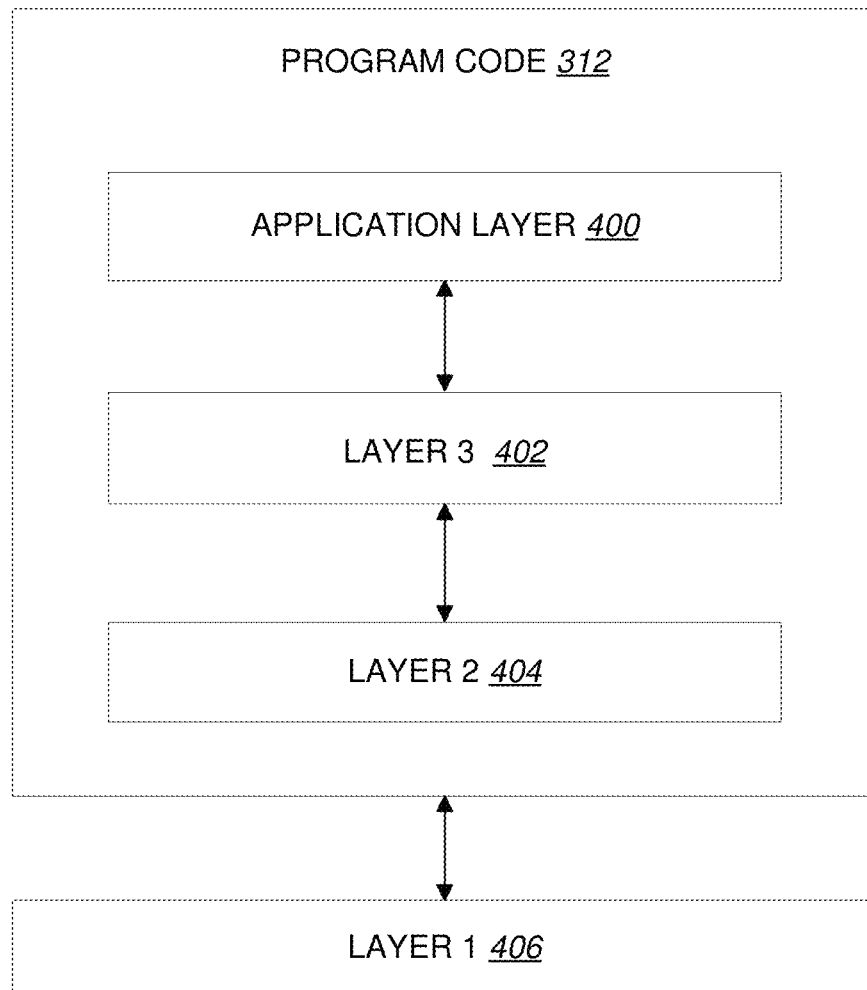
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
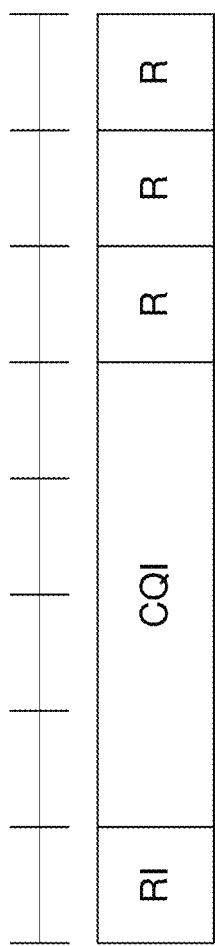
FIG. 5 illustrates a Sidelink (SL) Channel State Information (CSI) Medium Access Control (MAC) Control Element (CE), according to one exemplary embodiment.
Figure 6:
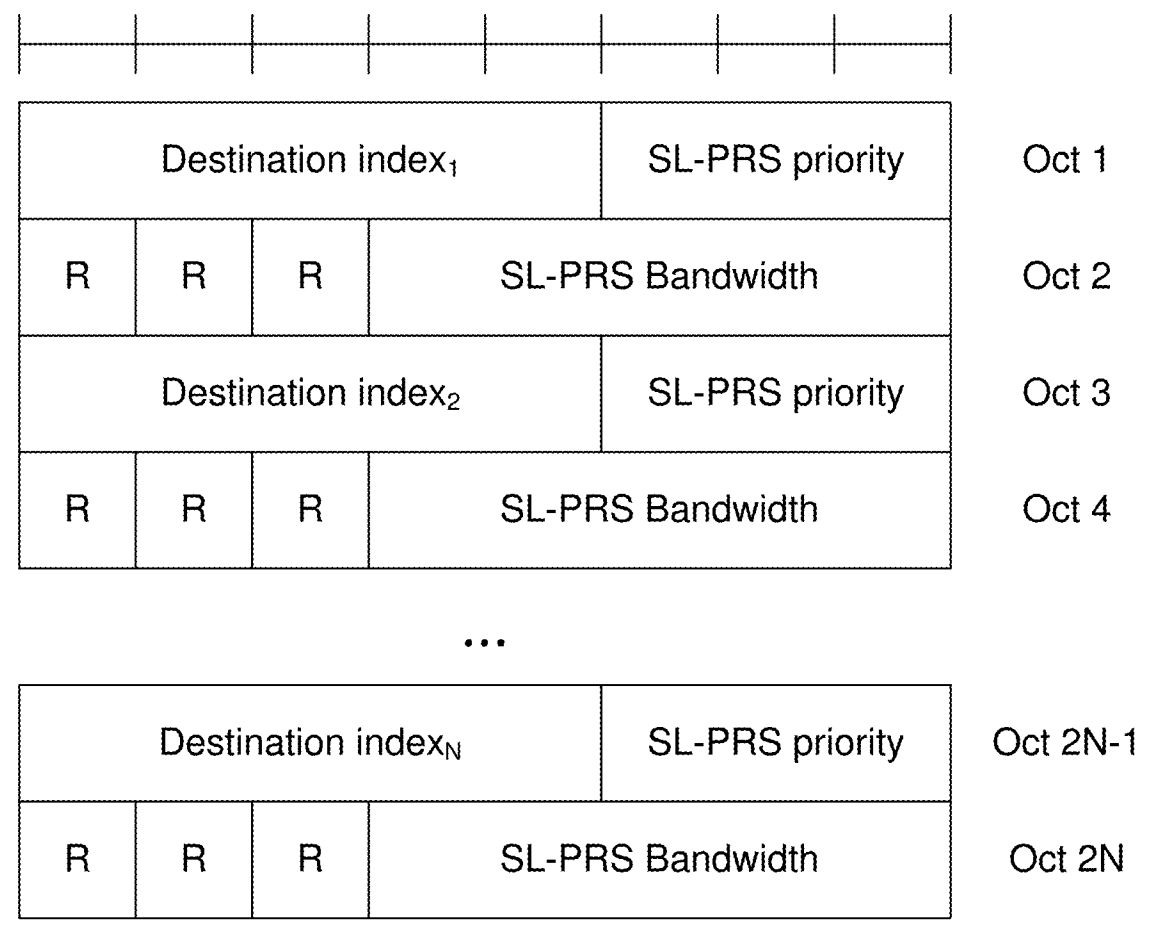

Aspects of a Scheduling Request (SR) are discussed in 3GPP TS 38.321 V 18.2.0 (2024 June). Notably, FIG. 6.1.3.35-1: of Section 6.1.3.35 of 3GPP TS 38.321 V 18.2.0 (2024 June), entitled "Sidelink CSI Reporting MAC CE", is reproduced herein as FIG. 5. FIG. 6.1.3.74-1: of Section 6.1.3.74 of 3GPP TS 38.321 V 18.2.0 (2024 June), entitled "SL-PRS Resource Request MAC control element", is reproduced herein as FIG. 6. One or more parts of 3GPP TS 38.321 V 18.2.0 (2024 June) are quoted below.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure recovery (see clause 5.21), at most one PUCCH resource for SR is configured per BWP. For a logical channel serving a radio bearer configured with SDT, PUCCH resource for SR is not configured for SDT. For beam failure recovery of BFD-RS set(s) of Serving Cell, up to two PUCCH resources for SR is configured per BWP. For positioning measurement gap activation/deactivation request, a dedicated SR configuration is configured.

Each SR configuration corresponds to one or more logical channels and/or to SCell beam failure recovery and/or to consistent LBT failure recovery and/or to beam failure recovery of a BFD-RS set and/or to positioning measurement gap activation/deactivation request. Each logical channel, SCell beam failure recovery, beam failure recovery of a BFD-RS set and consistent LBT failure recovery, may be mapped to zero or one SR configuration, which is configured by RRC. The SR configuration of the logical channel that triggered a BSR (clause 5.4.5) or a DSR (clause 5.4.9) or the SCell beam failure recovery or the beam failure recovery of a BFD-RS set or the consistent LBT failure recovery (clause 5.21) (if such a configuration exists) or positioning measurement gap activation/deactivation request (clause 5.25) is considered as corresponding SR configuration for the triggered SR. Any SR configuration may be used for an SR triggered by Pre-emptive BSR (clause 5.4.7) or Timing Advance reporting (clause 5.4.8).

RRC configures the following parameters for the scheduling request procedure:

sr-ProhibitTimer (per SR configuration);

sr-TransMax (per SR configuration).

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

All pending SR(s) for BSR triggered according to the BSR procedure (clause 5.4.5) prior to the MAC PDU assembly shall be cancelled and each respective sr-ProhibitTimer shall be stopped when the MAC PDU is transmitted and this PDU includes a Long, Refined Long or Short BSR MAC CE which contains buffer status up to (and including) the last event that triggered a BSR (see clause 5.4.5) prior to the MAC PDU assembly. All pending SR(s) for BSR triggered according to the BSR procedure (clause 5.4.5) shall be cancelled and each respective sr-ProhibitTimer shall be stopped when the UL grant(s) can accommodate all pending data available for transmission.

The MAC entity shall for each pending SR not triggered according to the BSR procedure (clause 5.4.5) for a Serving Cell:

1> if this SR was triggered by Pre-emptive BSR procedure (see clause 5.4.7) prior to the MAC PDU assembly and a MAC PDU containing the relevant Pre-emptive BSR MAC CE is transmitted; or 1> if this SR was triggered by beam failure recovery (see clause 5.17) of an SCell and a MAC PDU is transmitted and this PDU includes a MAC CE for BFR which contains beam failure recovery information for this SCell; or 1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or 1> if this SR was triggered by beam failure recovery (see clause 5.17) of an SCell and this SCell is deactivated (see clause 5.9); or 1> if this SR was triggered by beam failure recovery (see clause 5.17) for a BFD-RS set of an SCell and this SCell is deactivated (see clause 5.9); or 1> if the SR is triggered by positioning measurement gap activation/deactivation request (see clause 5.25) and the Positioning Measurement Gap Activation/Deactivation Request MAC CE that triggers the SR has already been cancelled; or 1> if this SR was triggered by consistent LBT failure recovery (see clause 5.21) of an SCell and a MAC PDU is transmitted and the MAC PDU includes an LBT failure MAC CE that indicates consistent LBT failure for this SCell; or 1> if this SR was triggered by consistent LBT failure recovery (see clause 5.21) of an SCell and all the triggered consistent LBT failure(s) for this SCell are cancelled; or
1> if this SR was triggered by Timing Advance reporting (see clause 5.4.8) and all the triggered Timing Advance reports are cancelled; or
1> if this SR was triggered by DSR procedure (see clause 5.4.9) and the DSR that triggered the SR has been cancelled:
  2> cancel the pending SR and stop the corresponding sr-ProhibitTimer, if running.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR; and
1> if there is no ongoing RACH-less LTM cell switch; and
1> if rach-LessHO is not configured:
  2> initiate a Random Access procedure (see clause 5.1) on the SpCell and cancel the pending SR.
1> else, for the SR configuration corresponding to the pending SR:
  2> when the MAC entity has an SR transmission occasion on the valid PUCCH resource for SR configured; and
  2> if sr-ProhibitTimer is not running at the time of the SR transmission occasion; and
  2> if the PUCCH resource for the SR transmission occasion does not overlap with a measurement gap:
    3> if the PUCCH resource for the SR transmission occasion overlaps with neither a UL-SCH resource whose simultaneous transmission with the SR is not allowed by configuration of simultaneousPUCCH-PUSCH or simultaneousPUCCH-PUSCH-SecondaryPUCCHgroup or simultaneousSR-PUSCH-diffPUCCH-Groups or simultaneousPUCCH-PUSCH-SamePriority or simultaneousPUCCH-PUSCH-SamePriority-SecondaryPUCCHgroup nor an SL-SCH resource; or
    3> if the MAC entity is able to perform this SR transmission simultaneously with the transmission of the SL-SCH resource; or
    3> if the MAC entity is configured with Ich-basedPrioritization, and the PUCCH resource for the SR transmission occasion does not overlap with the PUSCH duration of an uplink grant received in a Random Access Response or with the PUSCH duration of an uplink grant addressed to Temporary C-RNTI or with the PUSCH duration of a MSGA payload, and the PUCCH resource for the SR transmission occasion for the pending SR triggered as specified in clause 5.4.5 overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized and its simultaneous transmission with the SR is not allowed by configuration of simultaneousPUCCH-PUSCH or simultaneousPUCCH-PUSCH-SecondaryPUCCHgroup or simultaneousSR-PUSCH-diffPUCCHgroups or simultaneousPUCCH-PUSCH-SamePriority or simultaneousPUCCH-PUSCH-SamePriority-SecondaryPUCCHgroup, and the priority of the uplink grant is determined as specified in clause 5.4.1; or
    3> if both sl-PrioritizationThres and ul-PrioritizationThres are configured and the PUCCH resource for the SR transmission occasion for the pending SR triggered as specified in clause 5.22.1.5 overlaps with any UL-SCH resource(s) carrying a MAC PDU, and the value of the priority of the triggered SR determined as specified in clause 5.22.1.5 is lower than sl-PrioritizationThres and the value of the highest priority of the logical channel(s) in the MAC PDU is higher than or equal to ul-PrioritizationThres and any MAC CE prioritized as described in clause 5.4.3.1.3 is not included in the MAC PDU and the MAC PDU is not prioritized by upper layer according to TS 23.287 [19]; or
    3> if an SL-SCH resource overlaps with the PUCCH resource for the SR transmission occasion for the pending SR triggered as specified in clause 5.4.5, and the MAC entity is not able to perform this SR transmission simultaneously with the transmission of the SL-SCH resource, and either transmission on the SL-SCH resource is not prioritized as described in clause 5.22.1.3.1a or the priority value of the logical channel that triggered SR is lower than ul-PrioritizationThres, if configured; or
    3> if an SL-SCH resource overlaps with the PUCCH resource for the SR transmission occasion for the pending SR triggered as specified in clause 5.22.1.5, and the MAC entity is not able to perform this SR transmission simultaneously with the transmission of the SL-SCH resource, and the priority of the triggered SR determined as specified in clause 5.22.1.5 is higher than the priority of the MAC PDU determined as specified in clause 5.22.1.3.1a for the SL-SCH resource; or
    3> if an SL-PRS resource overlaps with the PUCCH resource for the SR transmission occasion for the pending SR triggered as specified in clause 5.4.5, and the MAC entity is not able to perform this SR transmission simultaneously with the transmission of the SL-PRS resource, and either transmission on the SL-PRS resource is not prioritized as described in clause 5.22.1.3.1a or the priority value of the logical channel that triggered SR is lower than ul-PrioritizationThres, if configured; or
    3> if an SL-PRS resource overlaps with the PUCCH resource for the SR transmission occasion for the pending SR triggered as specified in clause 5.22.1.5, and the MAC entity is not able to perform this SR transmission simultaneously with the transmission of the SL-PRS resource, and the priority of the triggered SR determined as specified in clause 5.22.1.5 is higher than the priority of the MAC PDU and SL-PRS, if available, determined as specified in clause 5.22.1.3.1a for the SL-PRS resource:
      4> consider the SR transmission as a prioritized SR transmission.
      4> consider the other overlapping uplink grant(s), if any, as a de-prioritized uplink grant(s), except for the overlapping uplink grant(s) whose simultaneous transmission is allowed by configuration of simultaneousPUCCH-PUSCH or simultaneousPUCCH-PUSCH-SecondaryPUC-CHgroup or simultaneousSR-PUSCH-diff-PUCCH-Groups or simultaneousPUCCH-PUSCH-SamePriority or simultaneousPUCCH-PUSCH-SamePriority-SecondaryPUCCHgroup;

4> if the de-prioritized uplink grant(s) is a configured uplink grant configured with autonomousTx whose PUSCH has already started:

5> stop the configuredGrantTimer for the corresponding HARQ process of the de-prioritized uplink grant(s);

5> stop the cg-RetransmissionTimer for the corresponding HARQ process of the de-prioritized uplink grant(s).

4> if SR_COUNTER<sr-TransMax:

5> instruct the physical layer to signal the SR on one valid PUCCH resource for SR;

5> if LBT failure indication is not received from lower layers:

6> increment SR_COUNTER by 1;

6> start the sr-ProhibitTimer.

5> else if lbt-FailureRecoveryConfig is not configured:

6> increment SR_COUNTER by 1.

4> else:

5> notify RRC to release PUCCH for all Serving Cells;

5> notify RRC to release SRS for all Serving Cells;

5> clear any configured downlink assignments and uplink grants;

5> clear any PUSCH resources for semi-persistent CSI reporting;

5> if rach-LessHO is not configured and if there is no ongoing RACH-less LTM cell switch:

6> initiate a Random Access procedure (see clause 5.1) on the SpCell and cancel all pending SRs.

3> else:

4> consider the SR transmission as a de-prioritized SR transmission.

NOTE 1: Except for SR for SCell beam failure recovery, the selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

NOTE 3: When the MAC entity has pending SR for SCell beam failure recovery and the MAC entity has one or more PUCCH resources (other than PUCCH resources of pending SR for beam failure recovery of a BFD-RS set) overlapping with PUCCH resource for SCell beam failure recovery for the SR transmission occasion, the MAC entity considers only the PUCCH resource for SCell beam failure recovery as valid. When the MAC entity has pending SR for beam failure recovery of a BFD-RS set of Serving Cell and the MAC entity has one or more PUCCH resources (other than PUCCH resources of pending SR for beam failure recovery) overlapping with PUCCH resource for beam failure recovery of that BFD-RS set for the SR transmission occasion, the MAC entity considers only the PUCCH resource for beam failure recovery of that BFD-RS set as valid.

NOTE 4: For a UE operating in a semi-static channel access mode as described in TS 37.213 [18], PUCCH resources overlapping with the set of consecutive symbols where the UE does not transmit before the start of a next channel occupancy time are not considered valid.

NOTE 5: If the MAC entity is configured with Ich-basedPrioritization, the MAC entity does not take UCI multiplexing according to the procedure specified in TS 38.213 [6] into account when determining whether the valid PUCCH resource for the SR transmission can be signalled by the physical layer and the SR transmission occasion overlaps with the PUSCH duration of an uplink grant of a MSGA payload.

NOTE 6: When the MAC entity has PUCCH resource for pending SR for SCell beam failure recovery overlapping with PUCCH resource for pending SR for beam failure recovery of a BFD-RS set for the SR transmission occasion, it's up to UE implementation to select PUCCH resource for SCell beam failure recovery or PUCCH resource for beam failure recovery of a BFD-RS set.

The MAC entity may stop, if any, ongoing Random Access procedure due to a pending SR for BSR, which was initiated by the MAC entity prior to the MAC PDU assembly and which has no valid PUCCH resources configured, if:

a MAC PDU is transmitted using a UL grant other than a UL grant provided by Random Access Response or a UL grant determined as specified in clause 5.1.2a for the transmission of the MSGA payload, and this PDU includes a BSR MAC CE which contains buffer status up to (and including) the last event that triggered a BSR (see clause 5.4.5) prior to the MAC PDU assembly; or the UL grant(s) can accommodate all pending data available for transmission.

The MAC entity may stop, if any, ongoing Random Access procedure due to a pending SR for SL-BSR, which has no valid PUCCH resources configured, if:

a MAC PDU is transmitted using a UL grant other than a UL grant provided by Random Access Response or a UL grant determined as specified in clause 5.1.2a for the transmission of the MSGA payload, and the ongoing Random Access procedure was initiated by the MAC entity prior to the MAC PDU assembly, and this PDU includes an SL-BSR MAC CE which contains buffer status up to (and including) the last event that triggered an SL-BSR (see clause 5.22.1.6) prior to the MAC PDU assembly; or the SL grant(s) can accommodate all pending data available for transmission, and the ongoing Random Access procedure was initiated by the MAC entity prior to the sidelink MAC PDU assembly.

The MAC entity may stop, if any, ongoing Random Access procedure due to a pending SR for SL-CSI reporting, which has no valid PUCCH resources configured, if:

the SL grant can accommodate SL-CSI reporting MAC CE for transmission.

The MAC entity may stop, if any, ongoing Random Access procedure due to a pending SR for SL-DRX command indication, which has no valid PUCCH resources configured, if:

the SL grant can accommodate SL-DRX command indication for transmission.

The MAC entity may stop, if any, ongoing Random Access procedure due to a pending SR for BFR of an SCell, which has no valid PUCCH resources configured, if:
- a MAC PDU is transmitted using a UL grant other than a UL grant provided by Random Access Response or a UL grant determined as specified in clause 5.1.2a for the transmission of the MSGA payload, and this PDU contains a MAC CE for BFR which includes beam failure recovery information of that SCell; or
- the SCell is deactivated (as specified in clause 5.9) and all triggered BFRs for SCells are cancelled.

The MAC entity may stop, if any, ongoing Random Access procedure due to a pending SR for BFR of a BFD-RS set of a Serving Cell, which has no valid PUCCH resources configured, if:
- a MAC PDU is transmitted using a UL grant other than a UL grant provided by Random Access Response or a UL grant determined as specified in clause 5.1.2a for the transmission of the MSGA payload, and this PDU contains an Enhanced BFR MAC CE or a Truncated Enhanced BFR MAC CE which includes beam failure recovery information of that BFD-RS set of the Serving Cell.

The MAC entity may stop, if any, ongoing Random Access procedure due to a pending SR for consistent LBT failure recovery, which has no valid PUCCH resources configured, if:
- a MAC PDU is transmitted using a UL grant other than a UL grant provided by Random Access Response or a UL grant determined as specified in clause 5.1.2a for the transmission of the MSGA payload, and this PDU includes an LBT failure MAC CE that indicates consistent LBT failure for all the SCells that triggered consistent LBT failure; or
- all the SCells that triggered consistent LBT failure recovery are deactivated (see clause 5.9).

The MAC entity may stop, if any, ongoing Random Access procedure due to a pending SR for Sidelink consistent LBT failure recovery, which has no valid PUCCH resources configured, if one of the following conditions is met:
- a MAC PDU is transmitted using a UL grant other than a UL grant provided by Random Access Response or a UL grant determined as specified in clause 5.1.2a for the transmission of the MSGA payload, and this PDU includes an SL LBT failure MAC CE that indicates Sidelink consistent LBT failure; or
- all the triggered Sidelink consistent LBT failure recovery are cancelled (see clause 5.31.2).

The MAC entity may stop, if any, ongoing Random Access procedure due to a pending SR for positioning measurement gap activation/deactivation request, which has no valid PUCCH resources configured, if:
- the Positioning Measurement Gap Activation/Deactivation Request MAC CE that triggers the SR corresponding to the Random Access procedure has already been cancelled.

The MAC entity may stop, if any, ongoing Random Access procedure due to a pending SR for Timing Advance report, which has no valid PUCCH resources configured, if:
- a MAC PDU is transmitted using a UL grant other than a UL grant provided by Random Access Response or a UL grant determined as specified in clause 5.1.2a for the transmission of the MSGA payload, and this PDU includes a Timing Advance Report MAC CE (see clause 5.4.8).

The MAC entity may stop, if any, ongoing Random Access procedure due to a pending SR for DSR, which has no valid PUCCH resources configured, if:
- a MAC PDU is transmitted using a UL grant other than a UL grant provided by Random Access Response or a UL grant determined as specified in clause 5.1.2a for the transmission of the MSGA payload, and this PDU includes either a DSR MAC CE or
- all the PDCP SDUs associated with the DSR (see clause 5.4.9); or
- all the PDCP SDUs associated with the DSR have been discarded (see clause 5.4.9).

The MAC entity may stop, if any, ongoing Random Access procedure due to a pending SR for SL-PRS Resource Request, which has no valid PUCCH resources configured, if:
- a MAC PDU is transmitted using a UL grant other than a UL grant provided by Random Access Response or a UL grant determined as specified in clause 5.1.2a for the transmission of the MSGA payload, and this PDU includes a SL-PRS Resource Request MAC CE (see clause 5.22.1.12).

[ . . . ]

5.4.5 Buffer Status Reporting

The Buffer Status reporting (BSR) procedure is used to provide the serving gNB with information about UL data volume in the MAC entity.

[ . . . ]

Each logical channel may be allocated to an LCG using the logicalChannelGroup. The maximum number of LCGs is eight except for IAB-MTs configured with logicalChannelGroupIAB-Ext, for which the maximum number of LCGs is 256.

The MAC entity determines the amount of UL data available for a logical channel according to the data volume calculation procedure in TSs 38.322 [3] and 38.323 [4].

A BSR shall be triggered if any of the following events occur for activated cell group:
- UL data, for a logical channel which belongs to an LCG, becomes available to the MAC entity; and either
  - this UL data belongs to a logical channel with higher priority than the priority of any logical channel containing available UL data which belong to any LCG; or
  - none of the logical channels which belong to an LCG contains any available UL data.
  in which case the BSR is referred below to as 'Regular BSR';
- UL resources are allocated and number of padding bits is equal to or larger than the size of the Buffer Status Report MAC CE plus its subheader, in which case the BSR is referred below to as 'Padding BSR';
- retxBSR-Timer expires, and at least one of the logical channels which belong to an LCG contains UL data, in which case the BSR is referred below to as 'Regular BSR';
- periodicBSR-Timer expires, in which case the BSR is referred below to as 'Periodic BSR'.

NOTE 1: When Regular BSR triggering events occur for multiple logical channels simultaneously, each logical channel triggers one separate Regular BSR.

For Regular BSR, the MAC entity shall:
1> if the BSR is triggered for a logical channel for which logicalChannelSR-DelayTimerApplied with value true is configured by upper layers and SDT procedure is not ongoing according to clause 5.27:
　2> start or restart the logicalChannelSR-DelayTimer.

1> else if BSR is triggered for a logical channel for which logicalChannelSR-DelayTimerApplied with value true is configured by upper layers and SDT procedure is ongoing according to clause 5.27:
   2> start or restart logicalChannelSR-DelayTimer with the value as configured by the sdt-LogicalChannelSR-DelayTimer, if configured.
1> else:
   2> if running, stop the logicalChannelSR-DelayTimer.

[ . . . ]

The MAC entity shall:
1> if the Buffer Status reporting procedure determines that at least one BSR has been triggered and not cancelled:
   2> if UL-SCH resources are available for a new transmission and the UL-SCH resources can accommodate the BSR MAC CE plus its subheader as a result of logical channel prioritization:
     3> instruct the Multiplexing and Assembly procedure to generate the BSR MAC CE(s) as defined in clause 6.1.3.1;
     3> start or restart periodicBSR-Timer except when all the generated BSRs are long or short Truncated or Extended long or short Truncated BSRs;
     3> start or restart retxBSR-Timer.
   2> if a Regular BSR has been triggered and logicalChannelSR-DelayTimer is not running:
     3> if there is no UL-SCH resource available for a new transmission; or
     3> if the MAC entity is configured with configured uplink grant(s) and the Regular BSR was triggered for a logical channel for which logicalChannelSR-Mask is set to false; or
     3> if the UL-SCH resources available for a new transmission do not meet the LCP mapping restrictions (see clause 5.4.3.1) configured for the logical channel that triggered the BSR:
        4> trigger a Scheduling Request.

[ . . . ]

5.22.1.3.1a Sidelink Process not Associated with Dedicated SL-PRS Resource Pool

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU and SL-PRS, if available, is determined by the highest priority of the logical channel(s), MAC CE(s) in the MAC PDU or SL-PRS.

If the Sidelink HARQ Entity requests a new transmission, the Sidelink process shall:
1> store the MAC PDU in the associated HARQ buffer;
1> store the sidelink grant received from the Sidelink HARQ Entity;
1> generate a transmission as described below.

If the Sidelink HARQ Entity requests a retransmission, the Sidelink process shall:
1> store the sidelink grant received from the Sidelink HARQ Entity;
1> generate a transmission as described below.

To generate a transmission, the Sidelink process shall:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
   2> instruct the physical layer to transmit SCI according to the stored sidelink grant with the associated Sidelink transmission information;
   2> instruct the physical layer to generate a transmission according to the stored sidelink grant;
   2> if HARQ feedback has been enabled for the MAC PDU according to clause 5.22.1.4.2:
     3> instruct the physical layer to monitor PSFCH for the transmission and perform PSFCH reception as specified in clause 5.22.1.3.2.
   2> if sl-PUCCH-Config is configured by RRC for the stored sidelink grant:
     3> determine transmission of an acknowledgement on the PUCCH as specified in clause 5.22.1.3.2.
1> if this transmission corresponds to the last transmission of the MAC PDU and SL-PRS, if available:
   2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or
1> if a positive acknowledgement to this transmission of the MAC PDU was received according to clause 5.22.1.3.2, except a positive acknowledgement to Multi-consecutive slots transmission (i.e., multiple TBs case) of the MAC PDU and there is remaining slot(s) for this MAC PDU; or
1> if negative-only acknowledgement was enabled in the SCI and no negative acknowledgement was received for this transmission of the MAC PDU according to clause 5.22.1.3.2:
   2> flush the HARQ buffer of the associated Sidelink process.

The transmission of the MAC PDU or SL-PRS, if available, is prioritized over uplink transmission(s) of the MAC entity or the other MAC entity if the following conditions are met:

1> if the MAC entity is not able to perform this sidelink transmission simultaneously with all uplink transmission(s) at the time of the transmission, and
1> if none of the uplink transmission(s) is prioritized by upper layer according to TS 23.287 [19], and
1> if none of the NR uplink MAC PDU(s) includes any MAC CE prioritized as described in clause 5.4.3.1.3, and
1> if ul-PrioritizationThres is configured and if the value of the highest priority of logical channel(s) of all the NR uplink transmission(s) is not lower than ul-PrioritizationThres, and
1> if sl-PrioritizationThres is configured and if the value of the highest priority of logical channel(s) or MAC CE(s) in the MAC PDU is lower than sl-PrioritizationThres.
NOTE 2: If the MAC entity is not able to perform this sidelink transmission simultaneously with all uplink transmissions as specified in clause 5.4.2.2 of TS 36.321 at the time of the transmission, and prioritization-related information is not available prior to the time of this sidelink transmission due to processing time restriction, it is up to UE implementation whether this sidelink transmission is performed.
[ . . . ]

5.22.1.3.5 Sidelink Process Associated with Dedicated SL-PRS Resource Pool

If the Sidelink process is configured to perform transmissions of multiple SL-PRS with Sidelink resource allocation scheme 2, the process maintains a counter SL_RESOURCE_RESELECTION_COUNTER. For other configurations of the Sidelink process, this counter is not available. For each SL-PRS new transmission or retransmission, the MAC entity shall:
1> if there is no uplink transmission; or
1> if there is uplink transmission and the sidelink transmission is prioritized over uplink transmission:
2> instruct the physical layer to transmit SCI of the SL grant with the associated SL-PRS transmission information on Dedicated SL-PRS resource pool;
2> instruct the physical layer to generate the SL-PRS on Dedicated SL-PRS resource pool.
1> if this transmission corresponds to the last transmission of the SL-PRS transmission:
2> decrement SL_RESOURCE_RESELECTION_COUNTER by 1, if available.

The transmission of the SL-PRS is prioritized over uplink transmission(s) of the MAC entity or the other MAC entity if the following conditions are met:
1> if the MAC entity is not able to perform this sidelink transmission simultaneously with all uplink transmission(s) at the time of the transmission, and
1> if ul-PrioritizationThres is configured and if the value of the highest priority of logical channel(s) of all the NR uplink transmission(s) is not lower than ul-PrioritizationThres, and
1> if sl-PrioritizationThres is configured and if the value of SL-PRS priority is lower than sl-PrioritizationThres.
[ . . . ]

5.22.1.5 Scheduling Request

In addition to clause 5.4.4, the Scheduling Request (SR) is also used for requesting SL-SCH resources for new transmission when triggered by the Sidelink BSR (clause 5.22.1.6) or the SL-CSI reporting (clause 5.22.1.7) or SL-DRX Command indication. The Scheduling Request (SR) is also used for requesting SL-PRS resources for new transmission when triggered by SL-PRS resource request (clause 6.1.3.74). If configured, the MAC entity performs the SR procedure as specified in this clause unless otherwise specified in clause 5.4.4. For a sidelink logical channel or for SL-CSI reporting or for SL-DRX Command indication or for Sidelink consistent LBT failure recovery or for SL-PRS Resource Request, at most one PUCCH resource for SR is configured per UL BWP.

The SR configuration of the logical channel that triggered the Sidelink BSR (clause 5.22.1.6) is also considered as corresponding SR configuration for the triggered SR (clause 5.4.4). The value of the priority of the triggered SR corresponds to the value of priority of the logical channel that triggered the SR.

Each sidelink logical channel and Sidelink consistent LBT failure recovery may be mapped to zero or one SR configuration, which is configured by RRC. If the SL-CSI reporting procedure is enabled by RRC, the SL-CSI reporting is mapped to one SR configuration for all PC5-RRC connections. The SR configuration of the SL-CSI reporting triggered according to 5.22.1.7 is considered as corresponding SR configuration for the triggered SR (clause 5.4.4). The value of the priority of the triggered SR triggered by SL-CSI reporting corresponds to the value of the priority of the Sidelink CSI Reporting MAC CE. The SR configuration of the SL-CSI reporting is considered as corresponding SR configuration for the triggered SR of SL-DRX Command indication triggered according to 5.28.3. The value of the priority of the triggered SR triggered by SL-DRX Command indication corresponds to the value of the priority of the Sidelink DRX Command MAC CE. The SR configuration of the Sidelink consistent LBT failure recovery triggered according to 5.31.2 is considered as corresponding SR configuration for the triggered SR (clause 5.4.4). The value of the priority of the triggered SR triggered by Sidelink consistent LBT failure recovery corresponds to the value of the priority of the SL LBT failure MAC CE. SL-PRS resource request may be mapped to zero or one SR configuration, which is configured by RRC. The value of the priority of the triggered SR triggered by SL-PRS resource request corresponds to the value of the priority of the SL-PRS triggering the SL-PRS Resource Request MAC CE.

All pending SR(s) triggered according to the Sidelink BSR procedure (clause 5.22.1.6) prior to the MAC PDU assembly shall be cancelled and each respective sr-ProhibitTimer shall be stopped when the MAC PDU is transmitted and this PDU includes an SL-BSR MAC CE which contains buffer status up to (and including) the last event that triggered a Sidelink BSR (see clause 5.22.1.4) prior to the MAC PDU assembly.

All pending SR(s) triggered according to the Sidelink consistent LBT failure recovery (clause 5.31.2) shall be cancelled and each respective sr-ProhibitTimer shall be stopped when the MAC PDU is transmitted and this PDU includes an SL LBT failure MAC CE that indicates Sidelink consistent LBT failure or when all the triggered Sidelink consistent LBT failure(s) for an SL BWP is cancelled.

All pending SR(s) triggered according to the Sidelink BSR procedure (clause 5.22.1.6) shall be cancelled and each respective sr-ProhibitTimer shall be stopped when the SL grant(s) can accommodate all pending data available for transmission in sidelink.

If there is pending SR triggered by Sidelink consistent LBT failure recovery which has no corresponding SR configuration, MAC entity initiate a Random Access procedure (see clause 5.1) on the Serving Cell and cancel the pending SR.

The pending SR triggered according to the SL-CSI reporting for a destination shall be cancelled and each respective sr-ProhibitTimer shall be stopped when the SL grant(s) can accommodate the Sidelink CSI Reporting MAC CE when the SL-CSI reporting that has been triggered but not cancelled or when the triggered SL-CSI reporting is cancelled due to latency non-fulfilment as specified in 5.22.1.7. The pending SR triggered according to the SL-DRX Command indication for a destination shall be cancelled and each respective sr-ProhibitTimer shall be stopped when the SL grant(s) can accommodate the Sidelink DRX Command MAC CE when the SL-DRX Command indication that has been triggered but not cancelled. All pending SR(s) triggered by either Sidelink BSR or Sidelink CSI report or Sidelink DRX Command indication shall be cancelled, when RRC configures Sidelink resource allocation mode 2.

All pending SR(s) triggered according to the SL-PRS Resource Request procedure (clause 5.22.1.12) prior to the MAC PDU assembly shall be cancelled and each respective sr-ProhibitTimer shall be stopped when the MAC PDU is transmitted and this PDU includes an SL-PRS Resource Request MAC CE which contains status of the pending SL-PRS transmission(s) up to (and including) the last event that triggered a SL-PRS Resource Request (see clause 5.22.1.12) prior to the MAC PDU assembly.

All pending SR(s) triggered according to the SL-PRS Resource Request procedure (clause 5.22.1.12) shall be cancelled and each respective sr-ProhibitTimer shall be stopped when the SL grant(s) can accommodate the all the pending SL-PRS transmission(s).

[ ... ]

5.22.1.12 SL-PRS Resource Request

SL-PRS transmission can be triggered either by lower layer signalling from the peer UE or the UE's own upper layers. The SL-PRS Resource Request procedure is used to provide gNB with information about the triggered SL-PRS transmission.

The MAC entity shall, if Sidelink resource allocation scheme 1 for SL-PRS transmission is configured:
1> if aperiodic SL-PRS is triggered:
    2> trigger the SL-PRS Resource Request.
1> else if periodic SL-PRS is triggered:
    2> notify RRC to send SL-PRS Resource Request.

The MAC entity shall:
1> if SL-PRS Resource Request is triggered and not cancelled:
    2> if UL-SCH resources are available for a new transmission and these UL-SCH resources can accommodate the SL-PRS Resource Request MAC CE plus its subheader as a result of logical channel prioritization:
        3> instruct the Multiplexing and Assembly entity to generate the SL-PRS Resource Request MAC CE.
    2> else:
        3> trigger a Scheduling Request for the SL-PRS Resource Request MAC CE as specified in clause 5.4.4.

The SL-PRS Resource Request MAC CE may be cancelled when SL grant can accommodate all the pending SL-PRS transmissions. The SL-PRS Resource Request MAC CE shall be cancelled when a MAC PDU is transmitted and this PDU includes a SL-PRS Resource Request MAC CE that indicates request for all the pending SL-PRS transmission(s) since the last event the MAC CE is triggered.

[ ... ]

6.1.3.35 Sidelink CSI Reporting MAC CE

The Sidelink CSI Reporting MAC CE is identified by a MAC subheader with LCID as specified in Table 6.2.4-1. The priority of the Sidelink CSI Reporting MAC CE is fixed to '1'. The Sidelink CSI Reporting MAC CE is defined as follows (FIG. 6.1.3.35-1):

RI: This field indicates the derived value of the Rank Indicator for sidelink CSI reporting as specified in clause 8.5 of TS 38.214 [7]. The length of the field is 1 bit, the values of the rank indicator field are mapped to allowed rank indicator values with increasing order, where '0' is mapped to the smallest allowed rank indicator value;

CQI: This field indicates the derived value of the Channel Quality Indicator for sidelink CSI reporting as specified in clause 8.5 of TS 38.214 [7]. The length of the field is 4 bit;

R: Reserved bit, set to 0.

FIG. 6.1.3.35-1: Sidelink CSI Reporting MAC CE

[ ... ]

6.1.3.74 SL-PRS Resource Request MAC CE

The SL-PRS Resource Request MAC CE is identified by a MAC subheader with eLCID as specified in Table 6.2.1-1b. It has the following fields:

Destination index: The Destination Index field identifies the destination. The length of this field is 5 bits. The value is set to one index corresponding to SL destination identity associated to same destination reported in sl-PosTxResourceReqList if present. The value is indexed sequentially from 0 in the same ascending order of SL destination identity in sl-PosTxResourceReqList as specified in TS 38.331 [5]. When multiple lists are reported, the value is indexed sequentially across all the lists in the same order as presented in SidelinkUEInformaitonNR message;

SL-PRS priority: Priority of pending SL-PRS transmission. The length of this field is 3 bits;

SL-PRS Bandwidth: Requested minimum bandwidth of pending SL-PRS transmission. The length of this field is 5 bits. Encoding of this field is the same as sl-PRS-Bandwidth in IE SL-PRS-QoS-Info as specified in TS 38.331 [5] that codepoint value 0 corresponds to the value "mhz5" of the field sl-PRS-Bandwidth, codepoint value 1 corresponds to the value "mhz10" of the field sl-PRS-Bandwidth, and so on;

R: Reserved bit, set to 0.

FIG. 6.1.3.74-1: SL-PRS Resource Request MAC Control Element

In some examples, a Scheduling Request (SR) transmission may be triggered based upon a Sidelink Positioning Reference Signal (SL-PRS) resource request, which may be triggered based upon one or more SL-PRS transmissions (e.g., pending SL-PRS transmissions). For example, a User Equipment (UE) may trigger the SL-PRS resource request and/or generate a SL-PRS resource request Medium Access Control (MAC) Control Element (CE) indicative of the SL-PRS resource request in response to determining that the one or more SL-PRS transmissions are pending. The SR transmission may be triggered to request one or more uplink resources for transmission of the SL-PRS resource request MAC CE. In some systems, a priority value indicative of a priority of the triggered SR transmission triggered by the SL-PRS resource request corresponds to a priority value indicative of a priority associated with the one or more SL-PRS transmissions (that triggered the SL-PRS resource request and/or the SL-PRS resource request MAC CE, for example). In such systems, if an SL-PRS resource (associated with a Shared or Dedicated SL-PRS resource pool, for example) or a Sidelink-Shared Channel (SL-SCH) resource overlaps (e.g., at least partially overlaps in time and/or frequency domain) with an uplink resource (e.g., Physical Uplink Control Channel (PUCCH) resource) for a SR transmission occasion for the (pending) SR transmission triggered by the SL-PRS resource request, a scenario may occur in which even if the highest priority of the one or more (pending) SL-PRS transmissions is higher than a priority of the SL-PRS resource (and/or SL-PRS transmission) or the SL-SCH resource (and/or SL-SCH transmission), the SR transmission triggered by the SL-PRS resource request for the one or more pending SL-PRS transmissions may not be prioritized, thereby resulting in the (more important and/or urgent, for example) pending SL-PRS transmission(s) being incorrectly deprioritized and/or resulting in the UE not achieving service requirements (for relevant ongoing positioning services, for example). In some examples, the UE is not configured to perform the SR transmission to the network over Uu interface concurrently with the one or more SL transmissions (e.g., SL-PRS or SL-SCH) to one or more peer UEs over sidelink (SL) or PC5 interface.

Figure 7:
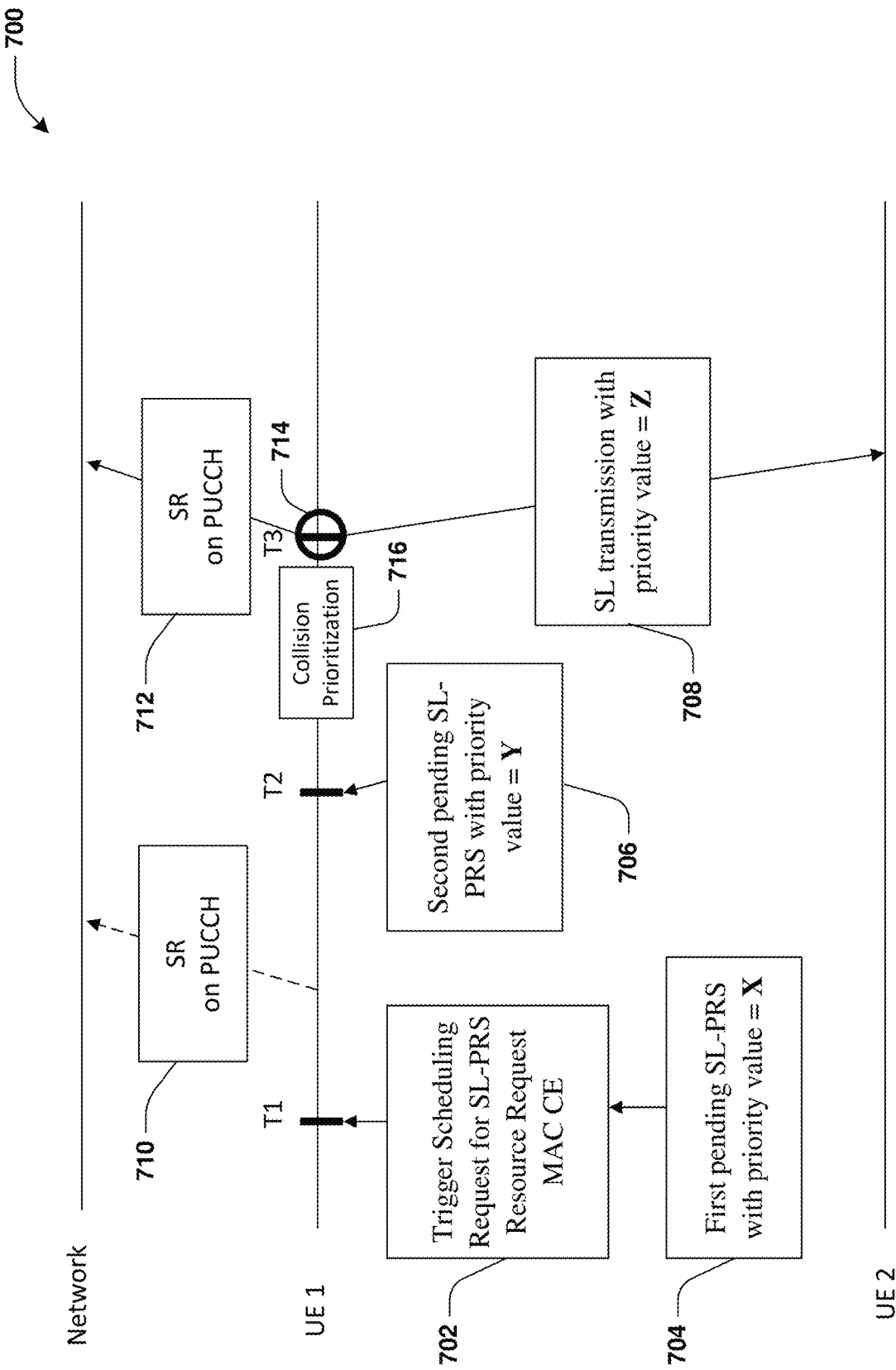
FIG. 7 is a diagram illustrating a scenario associated with performing a collision prioritization operation for a collision between a Scheduling Request (SR) transmission and a Sidelink (SL) transmission, according to one exemplary embodiment.

FIG. 7 illustrates an exemplary scenario 700 associated with performing a collision prioritization operation for a collision between a SR transmission and a SL transmission. A first UE ("UE 1" in FIG. 7) may identify a first pending SL-PRS 704 with a priority value=X. The first pending SL-PRS 704 may be triggered by the first UE (e.g., by a higher and/or upper layer of the first UE). The first pending SL-PRS 704 may be triggered based upon a Sidelink Control Information (SCI) (and/or in response to receiving the SCI) from a peer UE ("UE 2" in FIG. 7). A SR transmission 712 for the SL-PRS resource request MAC CE may be triggered 702 (by the first UE, for example) at a time T1. The SR transmission 712 may be triggered 702 based upon a SL-PRS resource request, which may be triggered based upon the first pending SL-PRS 704. For example, the first UE may trigger the SL-PRS resource request in response to determining that the first pending SL-PRS 704 is pending. The first UE may generate a SL-PRS resource request MAC CE indicative of the SL-PRS resource request (in response to triggering the SL-PRS resource request, for example). The SR transmission 712 may be triggered 702 to request one or more uplink resources for transmission of the SL-PRS resource request MAC CE (to a network, for example).

After the time T1, a second pending SL-PRS 706 with a priority value=Y may be triggered at a time T2. The second pending SL-PRS 706 may be triggered by the first UE (e.g., by a higher and/or upper layer of the first UE) and/or by an SCI from the peer UE or one or more other peer UEs. In some examples, one or more SR transmission occasions 710 (e.g., one or more PUCCH transmission occasions for the SR transmission 712 triggered 702 at the time T1, for example) for the triggered SR may or may not occur between the time T1 and the time T2. In some examples, the first UE may identify a potential collision 714 at a time T3 between the SR transmission 712 (e.g., one SR transmission on one SR transmission occasion) for the triggered SR (triggered 702 at the time T1) and a SL transmission 708 with a priority value=Z. The SL transmission 708 may comprise a transmission of SL data (on SL-SCH and/or PSSCH, for example). The SL transmission 708 may comprise a SL-PRS transmission (that may be associated with a Shared or Dedicated SL-PRS resource pool, for example). The SL transmission 708 may comprise a transmission of a SL-CSI. The collision 714 may correspond to a period in which an SL resource of the SL transmission 708 (e.g., a SL-SCH resource, a PSSCH resource, an SL-PRS resource of the Shared or Dedicated SL-PRS resource pool, etc.) overlaps (e.g., overlaps in time domain and/or frequency domain) with an uplink resource (e.g., PUCCH resource that may correspond to a SR transmission occasion with which the UE is configured and/or scheduled) of the SR transmission 712.

A priority value indicative of a priority of the SR transmission 712 may be determined to be X based upon X being the priority value of the first pending SL-PRS 704 that triggered the SL-PRS resource request (which triggered 702 the SR transmission 712, for example). In some systems, in a case of the exemplary scenario 700 where Y<Z<X, the SR transmission 712 may be deprioritized even though it is more beneficial to prioritize the SR transmission 712 since the priority (identified by priority value Y) of the second pending SL-PRS 706 is higher than that of the SL transmission 708 (identified by priority value Z). For example, the first UE may transmit the SL transmission 708 to the peer UE at the time T3 and/or may not transmit the SR transmission 712 to the network at the time T3. In some examples, a lower priority value may correspond to a higher priority such that Y (indicative of the priority of the second pending SL-PRS 706) being less than Z (indicative of the priority of the SL transmission 708) indicates that the priority of the second pending SL-PRS 706 is higher than the priority of the SL transmission 708. In some examples, the UE may be configured with a set of eight priority values from 1 to 8, where priority value '1' corresponds to the highest priority and/or priority value '8' corresponds to the lowest priority.

In accordance with some embodiments of the present disclosure, the first UE may perform an (enhanced) collision prioritization operation 716 to handle the collision 714 with improved prioritization. The collision prioritization operation 716 may comprise determining a SR priority value for the SR transmission 712 that takes priorities of a set of (pending) SL-PRSs (e.g., a set of one or more SL-PRSs) associated with the SL-PRS resource request (which triggered 702 the SR transmission 712, for example) into account. For example, the set of SL-PRSs may comprise all pending SL-PRSs associated with the SL-PRS resource request.

In some examples, the first UE may determine a set of priority values comprising one or more priority values of the set of SL-PRSs (e.g., priority values of all SL-PRSs of the set of SL-PRSs), and/or may determine the SR priority value based upon the set of priority values (e.g., all priority values of the set of priority values). In some examples, the set of SL-PRSs may comprise SL-PRSs (e.g., pending SL-PRSs) that triggered the SL-PRS resource request and/or the SL-PRS resource request MAC CE. For example, the set of SL-PRSs may comprise all SL-PRSs (and/or all pending SL-PRSs) that triggered the SL-PRS resource request. In some examples, the set of SL-PRSs may comprise SL-PRSs (e.g., pending SL-PRSs) indicated by the SL-PRS resource request MAC CE. For example, the set of SL-PRSs may comprise all SL-PRSs (and/or all pending SL-PRSs) that are indicated by the SL-PRS resource request MAC CE.

In some examples, the first UE may generate and/or maintain a pending SL-PRS data structure indicative of a set of pending SL-PRSs (e.g., the set of SL-PRSs) and/or priority values (e.g., the set of priority values) associated with the set of pending SL-PRSs (e.g., currently pending SL-PRSs). The first UE may generate and/or update the pending SL-PRS data structure to comprise first information associated with the first pending SL-PRS 704 in response to triggering and/or identifying the first pending SL-PRS 704. The first information may comprise the priority value=X of the first pending SL-PRS 704. In some examples, the first information may comprise the first pending SL-PRS 704 (which may be generated by the first UE, for example). The first UE may store the pending SL-PRS data structure in memory. The first UE may update the pending SL-PRS data structure to comprise second information associated with the second pending SL-PRS 706 (by accessing the memory and/or storing the second information in the memory, for example) in response to triggering and/or identifying the second pending SL-PRS 706. In some examples, the second information may comprise the priority value=Y of the second pending SL-PRS 706. In some examples, the second information may comprise the second pending SL-PRS 706 (which may be generated by the first UE, for example). In some examples, in response to triggering and/or identifying one or more other pending SL-PRSs (associated with one or more peer UEs, for example), the first UE may update the pending SL-PRS data structure to comprise information (e.g., priority values and/or other information) associated with the one or more other pending SL-PRSs. In some examples, the collision prioritization operation 716 may comprise accessing the memory and/or referencing the pending SL-PRS data structure to determine the set of SL-PRSs and/or the set of priority values (and/or subsequently using the determined set of SL-PRSs and/or the determined set of priority values to determine the SR priority value, for example). In some examples, the set of SL-PRSs may comprise pending SL-PRSs (e.g., all pending SL-PRSs) indicated by the pending SL-PRS data structure. In some examples, the set of priority values may comprise pending SL-PRSs (e.g., all pending SL-PRSs) indicated by the pending SL-PRS data structure. In some examples, the set of priority values may comprise priority values (e.g., all priority values) indicated by the pending SL-PRS data structure. In some examples, the pending SL-PRS data structure comprises the SL-PRS resource request MAC CE. In some examples, the SL-PRS resource request MAC CE is generated based upon the pending SL-PRS data structure.

In some examples, the collision prioritization operation 716 may comprise performing one or more operations (e.g., one or more mathematical and/or logical operations) on the set of priority values to determine the SR priority value. In some examples, the collision prioritization operation 716 may comprise analyzing the set of priority values to identify a target priority value (among the set of priority values) that is indicative of a highest priority among priorities indicated by the set of priority values, and determining the SR priority value based upon the target priority value. In a scenario in which a lower priority value corresponds to a higher priority, the target priority value may be a lowest (e.g., minimum) priority value among the set of priority values. Embodiments are contemplated in which a higher priority value may correspond to a higher priority, where the target priority value may be a highest (e.g., maximum) priority value among the set of priority values. In some examples, the SR priority value may be set equal to the target priority value (e.g., the lowest priority value among the set of priority values in the scenario in which a lower priority value corresponds to a higher priority).

The collision prioritization operation 716 may comprise using the SR priority value associated with the SR transmission 712 and the priority value (e.g., Z) of the SL transmission 708 to select one of the SR transmission 712 or the SL transmission 708 for transmission. For example, the first UE may select the SR transmission 712 for transmission based upon the SR priority value of the SR transmission 712 being indicative of a higher priority compared to the priority value (e.g., Z) of the SL transmission 708. For example, in a scenario in which a lower priority value corresponds to a higher priority, the first UE may select the SR transmission 712 for transmission based upon the SR priority value of the SR transmission 712 being less than the priority value (e.g., Z) of the SL transmission 708. Accordingly, in a scenario in which Y<Z<X, the SR priority value may be set to Y via the collision prioritization operation 716 (based upon Y being the lowest priority value among the set of priority values, for example), and the SR transmission 712 may be selected for transmission based upon the SR priority value (e.g., Y) being less than the priority value (e.g., Z) of the SL transmission 708 (indicating that the priority of the SR transmission 712 is greater than the priority of the SL transmission 708, for example). Thus, in accordance with some embodiments, performing the collision prioritization operation 716 results in the SR transmission 712 being (correctly) prioritized over the SL transmission 708, thereby providing for improved operation of the first UE and improved (and/or more efficient) communication with one or more peer UEs and/or the network that meets service requirements (for relevant ongoing positioning services, for example).

In some examples, the first UE may determine the SR priority value (and/or a priority value associated with the SL-PRS resource request MAC CE) to be a predefined (and/or fixed) value (e.g., the predefined value may be 1 to indicate highest priority). In some examples, the first UE may determine the SR priority value (and/or a priority value associated with the SL-PRS resource request MAC CE) based upon a configuration from a higher and/or upper layer (of the first UE, for example) or Radio Resource Control (RRC). In some examples, the SL-PRS resource request MAC CE may comprise a plurality of SL-PRS priority values indicative of priorities associated with a plurality of (different) peer and/or (destination) UEs and/or a plurality of (different) SL-PRS bandwidths.

In some examples, the first UE may perform the selected transmission (e.g., the SR transmission 712 or the SL transmission 708) selected by the collision prioritization operation 716. For example, if the SR transmission 712 is selected by the collision prioritization operation 716, the first UE may transmit the SR transmission 712 to the network via an uplink resource (e.g., PUCCH resource that may correspond to a SR transmission occasion with which the UE is configured and/or scheduled) of the SR transmission 712 (during the third time T3, for example). If the SL transmission 708 is selected by the collision prioritization operation 716, the first UE may transmit the SL transmission 708 to the network via an SL resource (e.g., a SL-SCH resource, a PSSCH resource, an SL-PRS resource of the Shared or Dedicated SL-PRS resource pool, etc.) of the SL transmission 708 (during the third time T3, for example).

In some examples, the SR transmission 712 may be triggered 702 (by the first UE, for example) in response to one or more requests and/or signals (other than and/or in addition to being triggered 702 in response to the SL-PRS resource request and/or the SL-PRS resource request MAC CE). For example, the one or more requests and/or signals (that triggered 702 the SR transmission 712, for example) may comprise an Uplink Buffer Status Report (UL BSR), a Sidelink Buffer Status Report (SL BSR), and/or one or more MAC CEs. In some examples, the first UE may perform the collision prioritization operation 716 (using one or more of the techniques provided herein) when a configuration and/or capability of the first UE does not allow the first UE to concurrently perform the SL transmission 708 and the SR transmission 712 (such that the first UE is not able to concurrently perform the SL transmission 708 and the SR transmission 712, for example). In some examples, in a scenario in which the SL resource associated with the SL transmission 708 comprises an SL-PRS resource of the Shared or Dedicated SL-PRS resource pool, the first UE may perform the collision prioritization operation 716 in response to a determination that the SL-PRS resource overlaps (e.g., at least partially overlaps in time and/or frequency domain) with the uplink resource (e.g., the PUCCH resource that may correspond to the SR transmission occasion with which the UE is configured and/or scheduled to perform the SR transmission 712) of the SR transmission 712 (during the third time T3, for example), the first UE may determine which of the SR transmission 712 or the SL transmission 708 to prioritize and/or select for transmission by performing the collision prioritization operation 716 (using one or more of the techniques provided herein). In some examples, a (deprioritized) transmission (e.g., the SR transmission 712 or the SL transmission 708) that is not selected by the collision prioritization operation 716 may be dropped and/or rescheduled.

One, some and/or all of the foregoing examples, concepts, techniques and/or embodiments can be formed and/or combined to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

To enhance 3GPP specification, such as 3GPP TS 38.321 V 18.2.0 (2024 June), for wireless communication in accordance with some embodiments herein, Enhancement 1 is provided herein. Enhancement 1 is reflective of implementation in accordance with some embodiments herein, and comprises modifications to 3GPP specification. According to some embodiments, at least a portion of Enhancement 1 may be implemented.

Enhancement 1 may be implemented according to one or more embodiments of the present disclosure. In Enhancement 1, addition 1, addition 2, addition 3, addition 4, addition 5, addition 6, addition 7, addition 8, addition 9, addition 10, addition 11, addition 12, addition 13, addition 14, and/or addition 15 are made to 3GPP TS 38.321 V 18.2.0 (2024 June). To distinguish addition X (where X=1, 2, 3, 4, 5, 6, 7, 8, 9, 10, 11, 12, 13, 14, 15) from what is originally included in 3GPP TS 38.321 V 18.2.0 (2024 June), addition X is in bold, and is preceded by the term "ADDITION X STARTS:" and followed by the term "ADDITION X ENDS". In Enhancement 1, deletion 1, deletion 2, and/or deletion 3 are made to 3GPP TS 38.321 V 18.2.0 (2024 June) to remove portions of 3GPP TS 38.321 V 18.2.0 (2024 June). To identify a portion of 3GPP TS 38.321 V 18.2.0 (2024 June) to be removed by deletion X (where X=1, 2, 3), the portion to be removed by deletion X is in bold, and is preceded by the term "DELETION X STARTS:" and followed by the term "DELETION X ENDS". In some examples, embodiments of the present disclosure may be implemented via one, some or all of additions 1-15 and/or one, some or all of deletions 1-3 in Enhancement 1.

Enhancement 1:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure recovery (see clause 5.21), at most one PUCCH resource for SR is configured per BWP. For a logical channel serving a radio bearer configured with SDT, PUCCH resource for SR is not configured for SDT. For beam failure recovery of BFD-RS set(s) of Serving Cell, up to two PUCCH resources for SR is configured per BWP. For positioning measurement gap activation/deactivation request, a dedicated SR configuration is configured.

[ . . . ]

As long as at least one SR is pending, the MAC entity shall for each pending SR:
  1> if the MAC entity has no valid PUCCH resource configured for the pending SR; and
  1> if there is no ongoing RACH-less LTM cell switch; and
  1> if rach-LessHO is not configured:
    2> initiate a Random Access procedure (see clause 5.1) on the SpCell and cancel the pending SR.
  1> else, for the SR configuration corresponding to the pending SR:
    2> when the MAC entity has an SR transmission occasion on the valid PUCCH resource for SR configured; and
    2> if sr-ProhibitTimer is not running at the time of the SR transmission occasion; and
    2> if the PUCCH resource for the SR transmission occasion does not overlap with a measurement gap:
      3> if the PUCCH resource for the SR transmission occasion overlaps with neither a UL-SCH resource whose simultaneous transmission with the SR is not allowed by configuration of simultaneousPUCCH-PUSCH or simultaneousPUCCH-PUSCH-SecondaryPUCCHgroup or simultaneousSR-PUSCH-diffPUCCH-Groups or simultaneousPUCCH-PUSCH-SamePriority or simultaneousPUCCH-PUSCH-Same Priority-SecondaryPUCCHgroup nor an SL-SCH resource; or
      3> if the MAC entity is able to perform this SR transmission simultaneously with the transmission of the SL-SCH resource; or
      3> if the MAC entity is configured with Ich-basedPrioritization, and the PUCCH resource for the SR transmission occasion does not overlap with the PUSCH duration of an uplink grant received in a Random Access Response or with the PUSCH duration of an uplink grant addressed to Temporary C-RNTI or with the PUSCH duration of a MSGA payload, and the PUCCH resource for the SR transmission occasion for the pending SR triggered as specified in clause 5.4.5 overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized and its simultaneous transmission with the SR is not allowed by configuration of simultaneousPUCCH-PUSCH or simultaneousPUCCH-PUSCH-SecondaryPUCCHgroup or simultaneousSR-PUSCH-diffPUCCHgroups or simultaneousPUCCH-PUSCH-SamePriority or simultaneousPUCCH-PUSCH-SamePriority-SecondaryPUCCHgroup, and the priority of the uplink grant is determined as specified in clause 5.4.1; or 3> if both sl-PrioritizationThres and ul-PrioritizationThres are configured and the PUCCH resource for the SR transmission occasion for the pending SR triggered as specified in clause 5.22.1.5 overlaps with any UL-SCH resource(s) carrying a MAC PDU, and the value of the priority of the triggered SR determined as specified in clause 5.22.1.5 is lower than sl-PrioritizationThres and the value of the highest priority of the logical channel(s) in the MAC PDU is higher than or equal to ul-PrioritizationThres and any MAC CE prioritized as described in clause 5.4.3.1.3 is not included in the MAC PDU and the MAC PDU is not prioritized by upper layer according to TS 23.287 [19]; or 3> if an SL-SCH resource ADDITION 1 STARTS: or SL-CSI resource ADDITION 1 ENDS overlaps with the PUCCH resource for the SR transmission occasion for the pending SR triggered as specified in clause 5.4.5, and the MAC entity is not able to perform this SR transmission simultaneously with the transmission of the SL-SCH resource, and either transmission on the SL-SCH resource is not prioritized as described in clause 5.22.1.3.1a or the priority value of the logical channel that triggered SR is lower than ul-PrioritizationThres, if configured; or 3> if an SL-SCH resource ADDITION 2 STARTS: or SL-CSI resource ADDITION 2 ENDS overlaps with the PUCCH resource for the SR transmission occasion for the pending SR triggered as specified in clause 5.22.1.5, and the MAC entity is not able to perform this SR transmission simultaneously with the transmission of the SL-SCH resource, and the priority of the triggered SR determined as specified in clause 5.22.1.5 is higher than the priority of the MAC PDU determined as specified in clause 5.22.1.3.1a for the SL-SCH resource; or 3> if an SL-PRS resource overlaps with the PUCCH resource for the SR transmission occasion for the pending SR triggered as specified in clause 5.4.5, and the MAC entity is not able to perform this SR transmission simultaneously with the transmission of the SL-PRS resource, and either transmission on the SL-PRS resource is not prioritized as described in clause 5.22.1.3.1a ADDITION 3 STARTS: or in clause 5.22.1.3.5, ADDITION 3 ENDS or the priority value of the logical channel that triggered SR is lower than ul-PrioritizationThres, if configured; or 3> if an SL-PRS resource overlaps with the PUCCH resource for the SR transmission occasion for the pending SR triggered as specified in clause 5.22.1.5, and the MAC entity is not able to perform this SR transmission simultaneously with the transmission of the SL-PRS resource, and the priority of the triggered SR determined as specified in clause 5.22.1.5 is higher than the priority of the MAC PDU DELETION 1 STARTS; and DELETION 1 ENDS ADDITION 4 STARTS; and/or ADDITION 4 ENDS SL-PRS, if available, determined as specified in clause 5.22.1.3.1a ADDITION 5 STARTS: or the priority of the SL-PRS in clause 5.22.1.3.5, ADDITION 5 ENDS for the SL-PRS resource:

ADDITION 6 STARTS:

3> if an SL-PRS resource overlaps with the PUCCH resource for the SR transmission occasion for the pending SR triggered as specified in clause 5.22.1.5, and the MAC entity is not able to perform this SR transmission simultaneously with the transmission of the SL-PRS resource, and the priority of the triggered SR determined as specified in clause 5.22.1.5 is higher than the priority of SL-PRS, if available, determined as specified in clause 5.22.1.3.5 for the SL-PRS resource:

ADDITION 6 ENDS

4> consider the SR transmission as a prioritized SR transmission.

4> consider the other overlapping uplink grant(s), if any, as a de-prioritized uplink grant(s), except for the overlapping uplink grant(s) whose simultaneous transmission is allowed by configuration of simultaneousPUCCH-PUSCH or simultaneousPUCCH-PUSCH-SecondaryPUCHgroup or simultaneousSR-PUSCH-diff-PUCCH-Groups or simultaneousPUCCH-PUSCH-SamePriority or simultaneousPUCCH-PUSCH-SamePriority-SecondaryPUCCHgroup;

4> if the de-prioritized uplink grant(s) is a configured uplink grant configured with autonomousTx whose PUSCH has already started:

5> stop the configuredGrantTimer for the corresponding HARQ process of the de-prioritized uplink grant(s);

5> stop the cg-RetransmissionTimer for the corresponding HARQ process of the de-prioritized uplink grant(s).

[ . . . ]

5.22.1.5 Scheduling Request

In addition to clause 5.4.4, the Scheduling Request (SR) is also used for requesting SL-SCH resources for new transmission when triggered by the Sidelink BSR (clause 5.22.1.6) or the SL-CSI reporting (clause 5.22.1.7) or SL-DRX Command indication. The Scheduling Request (SR) is also used for requesting SL-PRS resources for new transmission when triggered by SL-PRS resource request (clause 6.1.3.74). If configured, the MAC entity performs the SR procedure as specified in this clause unless otherwise specified in clause 5.4.4. For a sidelink logical channel or for SL-CSI reporting or for SL-DRX Command indication or for Sidelink consistent LBT failure recovery or for SL-PRS Resource Request, at most one PUCCH resource for SR is configured per UL BWP.

. . .

Each sidelink logical channel and Sidelink consistent LBT failure recovery may be mapped to zero or one SR configuration, which is configured by RRC. If the SL-CSI reporting procedure is enabled by RRC, the SL-CSI reporting is mapped to one SR configuration for all PC5-RRC connections. The SR configuration of the SL-CSI reporting triggered according to 5.22.1.7 is considered as corresponding SR configuration for the triggered SR (clause 5.4.4). The value of the priority of the triggered SR triggered by SL-CSI reporting corresponds to the value of the priority of the Sidelink CSI Reporting MAC CE. The SR configuration of the SL-CSI reporting is considered as corresponding SR configuration for the triggered SR of SL-DRX Command indication triggered according to 5.28.3. The value of the priority of the triggered SR triggered by SL-DRX Command indication corresponds to the value of the priority of the Sidelink DRX Command MAC CE. The SR configuration of the Sidelink consistent LBT failure recovery triggered according to 5.31.2 is considered as corresponding SR configuration for the triggered SR (clause 5.4.4). The value of the priority of the triggered SR triggered by Sidelink consistent LBT failure recovery corresponds to the value of the priority of the SL LBT failure MAC CE. SL-PRS resource request may be mapped to zero or one SR configuration, which is configured by RRC.

The value of the priority of the triggered SR triggered by SL-PRS resource request corresponds to the ADDITION 7 STARTS: minimum/lowest ADDITION 7 ENDS value of the ADDITION 8 STARTS: SL-PRS ADDITION 8 ENDS priority DELETION 2 STARTS: of the SL-PRS triggering DELETION 2 ENDS ADDITION 9 STARTS: indicated in ADDITION 9 ENDS the SL-PRS Resource Request MAC CE.

The value of the priority of the triggered SR triggered by SL-PRS resource request corresponds to the ADDITION 10 STARTS minimum/lowest ADDITION 10 ENDS value of the priority of DELETION 3 STARTS: the DELETION 3 ENDS ADDITION 11 STARTS: all ADDITION 11 ENDS SL-PRS ADDITION 12 STARTS: (s) ADDITION 12 ENDS triggering the SL-PRS Resource Request MAC CE.

6.1.3.74 SL-PRS Resource Request MAC CE

The SL-PRS Resource Request MAC CE is identified by a MAC subheader with eLCID as specified in Table 6.2.1-1b. ADDITION 13 STARTS: The priority of the SL-PRS Resource Request MAC CE is fixed to '1'. ADDITION 13 ENDS It has the following fields:

The SL-PRS Resource Request MAC CE is identified by a MAC subheader with eLCID as specified in Table 6.2.1-1b. ADDITION 14 STARTS: The priority of the SL-PRS Resource Request MAC CE is the highest priority (e.g. the minimum/lowest value) of SL-PRS priority indicated in the MAC CE. ADDITION 14 ENDS It has the following fields:

The SL-PRS Resource Request MAC CE is identified by a MAC subheader with eLCID as specified in Table 6.2.1-1b. ADDITION 15 STARTS: The priority of the SL-PRS Resource Request MAC CE is configured by higher layer or upper layer or RRC ADDITION 15 ENDS. It has the following fields:

Destination index: The Destination Index field identifies the destination. The length of this field is 5 bits. The value is set to one index corresponding to SL destination identity associated to same destination reported in sl-PosTxResourceReqList if present. The value is indexed sequentially from 0 in the same ascending order of SL destination identity in sl-PosTxResourceReqList as specified in TS 38.331 [5]. When multiple lists are reported, the value is indexed sequentially across all the lists in the same order as presented in SidelinkUEInformaitonNR message;

SL-PRS priority: Priority of pending SL-PRS transmission. The length of this field is 3 bits;

SL-PRS Bandwidth: Requested minimum bandwidth of pending SL-PRS transmission. The length of this field is 5 bits. Encoding of this field is the same as sl-PRS-Bandwidth in IE SL-PRS-QoS-Info as specified in TS 38.331 [5] that codepoint value 0 corresponds to the value "mhz5" of the field sl-PRS-Bandwidth, codepoint value 1 corresponds to the value "mhz10" of the field sl-PRS-Bandwidth, and so on;

R: Reserved bit, set to 0.

FIG. 6.1.3.74-1: SL-PRS Resource Request MAC Control Element

Figure 8:
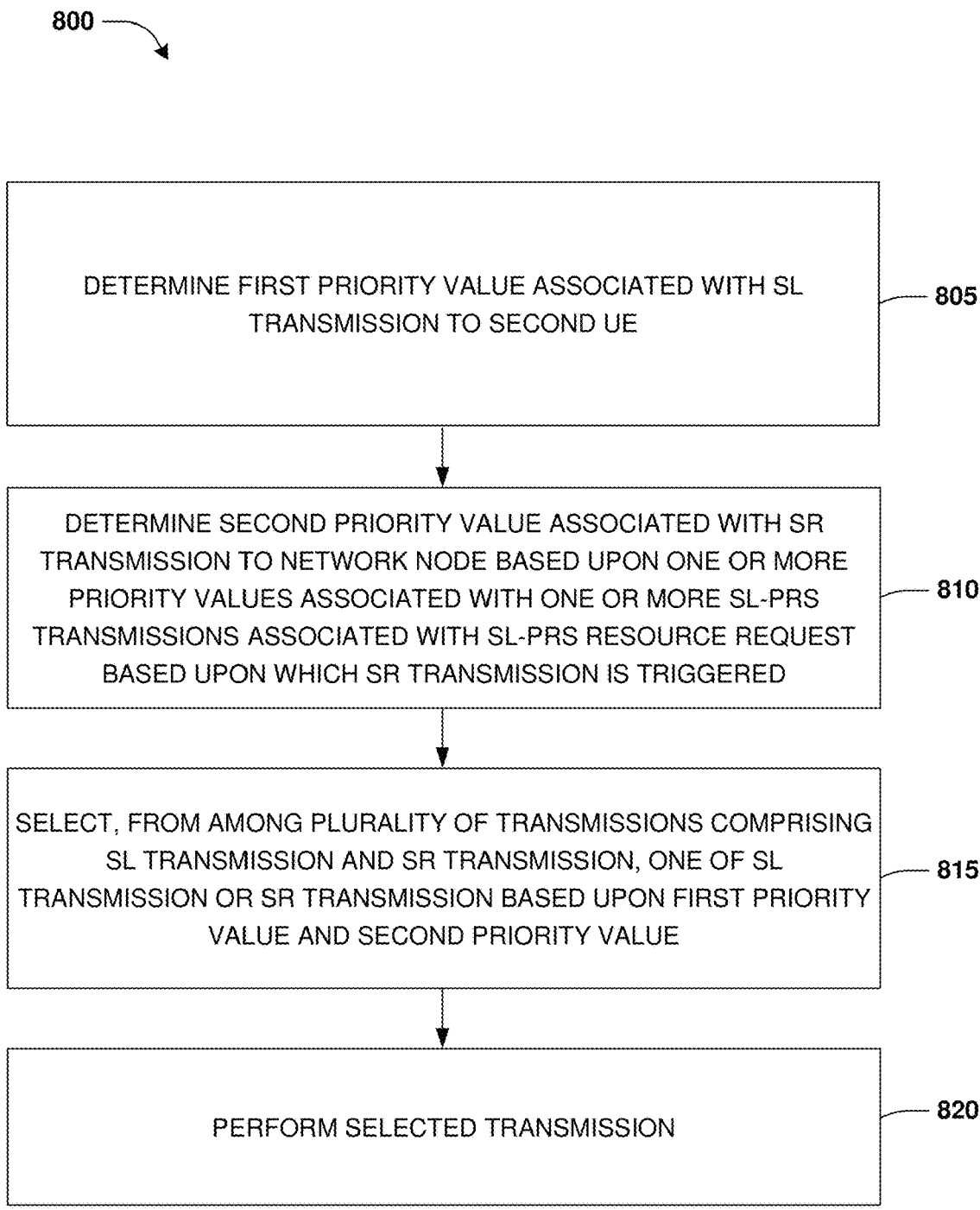
FIG. 8 is a flow chart according to one exemplary embodiment.

FIG. 8 is a flow chart 800 according to one exemplary embodiment from the perspective of a first UE. In step 805, the first UE determines a first priority value associated with a SL transmission to a second UE (e.g., a peer UE). In step 810, the first UE determines a second priority value associated with a SR transmission to a network node (e.g., a base station, a gNB, etc.) based upon one or more priority values associated with one or more SL-PRS transmissions associated with a SL-PRS resource request based upon which the SR transmission is triggered. In step 815, the first UE selects, from among a plurality of transmissions comprising the SL transmission and the SR transmission, one of the SL transmission or the SR transmission based upon the first priority value and the second priority value. In step 820, the first UE performs the selected transmission. For example, the first UE may perform the SR transmission if the SR transmission is selected, or the first UE may perform the SL transmission if the SL transmission is selected.

In some examples, the first UE drops and/or reschedules a second transmission, of the plurality of transmissions, different than the selected transmission. For example, the first UE may drop and/or reschedule the SL transmission if the SR transmission was selected, or the first UE may drop and/or reschedule the SR transmission if the SL transmission was selected.

In some examples, the first UE determines the first priority value based upon a configuration (e.g., a RRC configuration) with which the first UE is configured and/or a type of the SL transmission. The type may be indicative of whether the SL transmission is a SL data transmission (on SL-SCH and/or PSSCH, for example), a SL-PRS transmission using a SL-PRS resource of a Shared SL-PRS resource pool, a SL-PRS transmission using a SL-PRS resource of a Dedicated SL-PRS resource pool, a transmission of a SL-CSI, or other type of SL transmission.

In one embodiment, the SL transmission is associated with a SL resource that overlaps with a Physical Uplink Control Channel (PUCCH) resource associated with the SR transmission.

In one embodiment, performing the selected transmission comprises performing the SL transmission on the SL resource to the second UE (and/or one or more other peer UEs) in response to selecting the SL transmission from the plurality of transmissions, or performing the SR transmission on the PUCCH resource to the network node in response to selecting the SR transmission from the plurality of transmissions.

In one embodiment, determining the second priority value associated with the SR transmission comprises analyzing the one or more priority values to identify a third priority value indicative of a highest priority among one or more priorities indicated by the one or more priority values, and determining the second priority value based upon the third priority value. In some examples, a lower priority value corresponds to a higher priority, and thus the third priority value may correspond to a lowest (e.g., minimum) priority value among the one or more priority values. In some examples, the second priority value may be set to be equal to the third priority value (e.g., the lowest priority value of the one or more priority values associated with the one or more SL-PRS transmissions).

In one embodiment, the first UE is configured to perform the SL transmission and the SR transmission at non-overlapping times. For example, a configuration and/or capability of the first UE allows the first UE to perform the SL transmission and the SR transmission at non-overlapping times.

In one embodiment, a configuration and/or capability of the first UE does not allow the first UE to concurrently (and/or simultaneously) perform the SL transmission and the SR transmission (such that the first UE is not able to concurrently (and/or simultaneously) perform the SL transmission and the SR transmission, for example).

In one embodiment, the SL transmission comprises a SL data transmission.

In one embodiment, the SL transmission comprises a SL-PRS transmission associated with a dedicated SL-PRS resource pool. For example, the SL resource associated with the SL transmission may be a SL-PRS resource of the dedicated SL-PRS resource pool.

In one embodiment, the first UE selects the SR transmission based upon the second priority value associated with the SR transmission being indicative of a higher priority compared to the first priority value associated with the SL transmission. In some examples, a lower priority value corresponds to a higher priority, and thus the first UE may select the SR transmission based upon the second priority value being lower than the first priority value.

In one embodiment, the first UE selects the SL transmission based upon the first priority value associated with the SL transmission being indicative of a higher priority compared to the second priority value associated with the SR transmission. In some examples, a lower priority value corresponds to a higher priority, and thus the first UE may select the SL transmission based upon the first priority value being lower than the second priority value.

In one embodiment, the first UE generates a SL-PRS resource request MAC CE. In some examples, the SL-PRS resource request MAC CE is indicative of the SL-PRS resource request and/or used to deliver the SL-PRS resource request to the network node.

In one embodiment, the one or more SL-PRS transmissions comprise a plurality of pending SL-PRS transmissions, and the one or more priority values comprise a plurality of priority values associated with the plurality of pending SL-PRS transmissions. In some examples, the SL-PRS resource request MAC CE is indicative of the plurality of pending SL-PRS transmissions and the plurality of priority values. In some examples, the SL-PRS resource request MAC CE comprises a plurality of sets of information associated with the plurality of pending SL-PRS transmissions. In some examples, each set of information of the plurality of sets of information is indicative of a priority value (and/or other information) for a SL-PRS transmission of the plurality of pending SL-PRS transmissions.

In one embodiment, the SL-PRS resource request MAC CE is indicative of the one or more priority values.

In one embodiment, the SL-PRS resource request MAC CE is indicative of information associated with the one or more SL-PRS transmissions. For example, the SL-PRS resource request MAC CE may be used to provide the network node with information associated with pending SL-PRS transmissions (associated with one or more peer UEs).

In some examples, the first UE may identify a first pending SL-PRS transmission of the one or more SL-PRS transmissions. In some examples, the first pending SL-PRS transmission may be triggered by the first UE (e.g., by a higher and/or upper layer of the first UE). The SL-PRS resource request may be triggered (by the first UE, for example) in response to determining that the first pending SL-PRS transmission is pending (e.g., pending for transmission to one or more UEs). In some examples, the first UE may trigger the SR transmission in response to triggering the SL-PRS resource request and/or determining that the first pending SL-PRS transmission is pending. In some examples, after the first pending SL-PRS transmission is identified and/or the SL-PRS resource request is triggered, the first UE may identify a second pending SL-PRS transmission of the one or more SL-PRS transmissions. In some examples, the second pending SL-PRS transmission may be triggered by the first UE (e.g., by a higher and/or upper layer of the first UE). The SL-PRS resource request may be triggered (by the first UE, for example) in response to determining that the first pending SL-PRS transmission is pending (e.g., pending for transmission to one or more UEs). The first UE may generate the SL-PRS resource request MAC CE to be indicative of information associated with the first pending SL-PRS transmission to report to the network node (e.g., the information may comprise a priority value of the first pending SL-PRS transmission and/or one or more destination UEs of the first pending SL-PRS transmission), information associated with the second pending SL-PRS transmission to report to the network node (e.g., the information may comprise a priority value of the second pending SL-PRS transmission and/or one or more destination UEs of the second pending SL-PRS transmission), and/or information associated with one or more other pending SL-PRS transmissions to report to the network node.

In some examples, the first UE generates the plurality of transmissions comprising the SR transmission and the SL transmission. The first UE may group the (generated) plurality of transmissions together and/or may store the (grouped) plurality of transmissions (as a group, for example) in a memory. The first UE may store indications of priority values (e.g., the first priority value and/or the second priority value) and/or other information associated with the (grouped, for example) plurality of transmissions in the memory. In some examples, the UE accesses the memory to evaluate the priority values and/or the other information associated with the (grouped, for example) plurality of transmissions and determine to select the selected transmission from the (grouped, for example) plurality of transmissions based upon the evaluation (e.g., the UE may access the memory and/or evaluate the priority values to determine to select the selected transmission in response to detecting at least a partial overlap between the SL resource associated with the SL transmission and the PUCCH resource associated with the SR transmission) without selecting one or more other transmissions of the (grouped, for example) plurality of transmissions. In some examples, in response to selecting the selected transmission, the selected transmission may be retrieved from the memory and/or transmitted using an available resource (e.g., the SL resource if the SL transmission is selected or the SR resource if the SR transmission is selected). Embodiments are contemplated in which the priority values and the plurality of transmissions are stored in a single memory unit or in different memory units (which may be accessed to evaluate the priority values and/or retrieve the selected transmission, for example). In some examples, the priority values and the plurality of transmissions are stored in a single data structure. In some examples, the plurality of transmissions are stored in a transmission data structure, and the priority values are stored in a priority value data structure. The transmission data structure may comprise indications of links between transmissions in the transmission data structure and corresponding priority values in the priority value data structure. The priority value data structure may comprise indications of links between priority values in the priority value data structure and corresponding transmissions in the transmission data structure.

Referring back to FIGS. 3 and 4, in one exemplary embodiment of a first UE, the device 300 includes a program code 312 stored in the memory 310. The CPU 308 may execute program code 312 to enable the first UE (i) to determine a first priority value associated with a SL transmission to a second UE, (ii) to determine a second priority value associated with a SR transmission to a network node based upon one or more priority values associated with one or more SL-PRS transmissions associated with a SL-PRS resource request based upon which the SR transmission is triggered, (iii) to select, from among a plurality of transmissions comprising the SL transmission and the SR transmission, one of the SL transmission or the SR transmission based upon the first priority value and the second priority value, and (iv) to perform the selected transmission. Furthermore, the CPU 308 can execute the program code 312 to perform one, some and/or all of the above-described actions and steps and/or others described herein.

Figure 9:
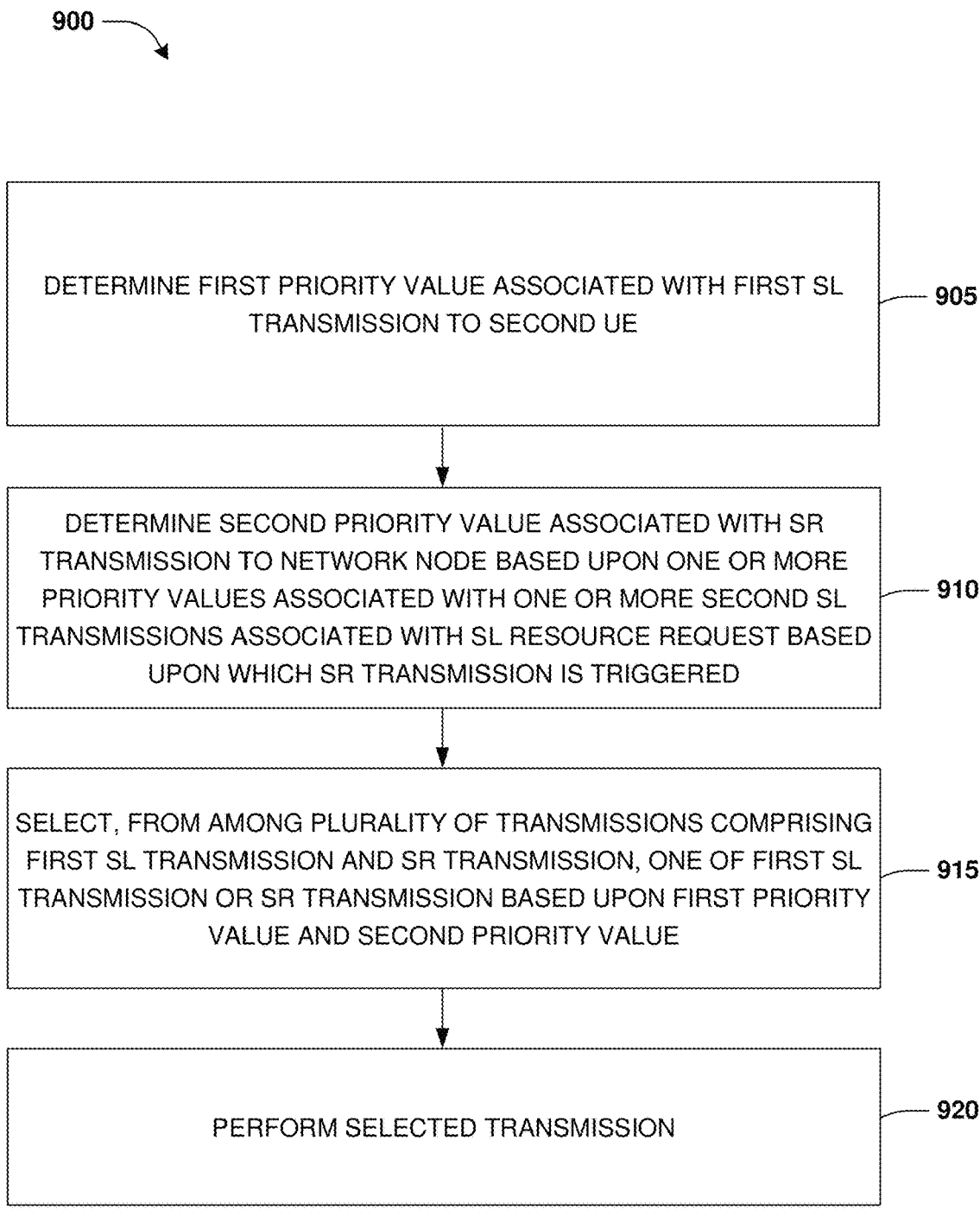
FIG. 9 is a flow chart according to one exemplary embodiment.

FIG. 9 is a flow chart 900 according to one exemplary embodiment from the perspective of a first UE. In step 905, the first UE determines a first priority value associated with a first SL transmission to a second UE. In step 910, the first UE determines a second priority value associated with a SR transmission to a network node (e.g., a base station, a gNB, etc.) based upon one or more priority values associated with one or more second SL transmissions (e.g., one or more SL-PRS transmissions and/or one or more other types of SL transmissions) associated with a SL resource request based upon which the SR transmission is triggered. In step 915, the first UE selects, from among a plurality of transmissions comprising the first SL transmission and the SR transmission, one of the first SL transmission or the SR transmission based upon the first priority value and the second priority value. In step 920, the first UE performs the selected transmission.

In some examples, the first UE generates a SL-PRS resource request message (e.g., a SL-PRS resource request MAC CE and/or other type of resource request message). In some examples, the SL-PRS resource request message is indicative of the SL-PRS resource request and/or used to deliver the SL-PRS resource request to the network node.

In some examples, the one or more second SL transmissions comprise a plurality of pending SL transmissions, and the one or more priority values comprise a plurality of priority values associated with the plurality of pending SL transmissions. In some examples, the SL-PRS resource request MAC CE is indicative of the plurality of pending SL transmissions and the plurality of priority values. In some examples, the SL-PRS resource request MAC CE comprises a plurality of sets of information associated with the plurality of pending SL transmissions. In some examples, each set of information of the plurality of sets of information is indicative of a priority value (and/or other information) for a SL-PRS transmission of the plurality of pending SL transmissions.

In one embodiment, determining the second priority value associated with the SR transmission comprises analyzing the one or more priority values to identify a third priority value indicative of a highest priority among one or more priorities indicated by the one or more priority values, and determining the second priority value based upon the third priority value.

In one embodiment, the first UE is configured to perform the first SL transmission and the SR transmission at non-overlapping times.

Referring back to FIGS. 3 and 4, in one exemplary embodiment of a UE, the device 300 includes a program code 312 stored in the memory 310. The CPU 308 may execute program code 312 to enable the UE (i) to determine a first priority value associated with a first SL transmission to a second UE, (ii) to determine a second priority value associated with a SR transmission to a network node based upon one or more priority values associated with one or more second SL transmissions associated with a SL resource request based upon which the SR transmission is triggered, (iii) to select, from among a plurality of transmissions comprising the first SL transmission and the SR transmission, one of the first SL transmission or the SR transmission based upon the first priority value and the second priority value, and (iv) to perform the selected transmission. Furthermore, the CPU 308 can execute the program code 312 to perform one, some and/or all of the above-described actions and steps and/or others described herein.

Figure 10:
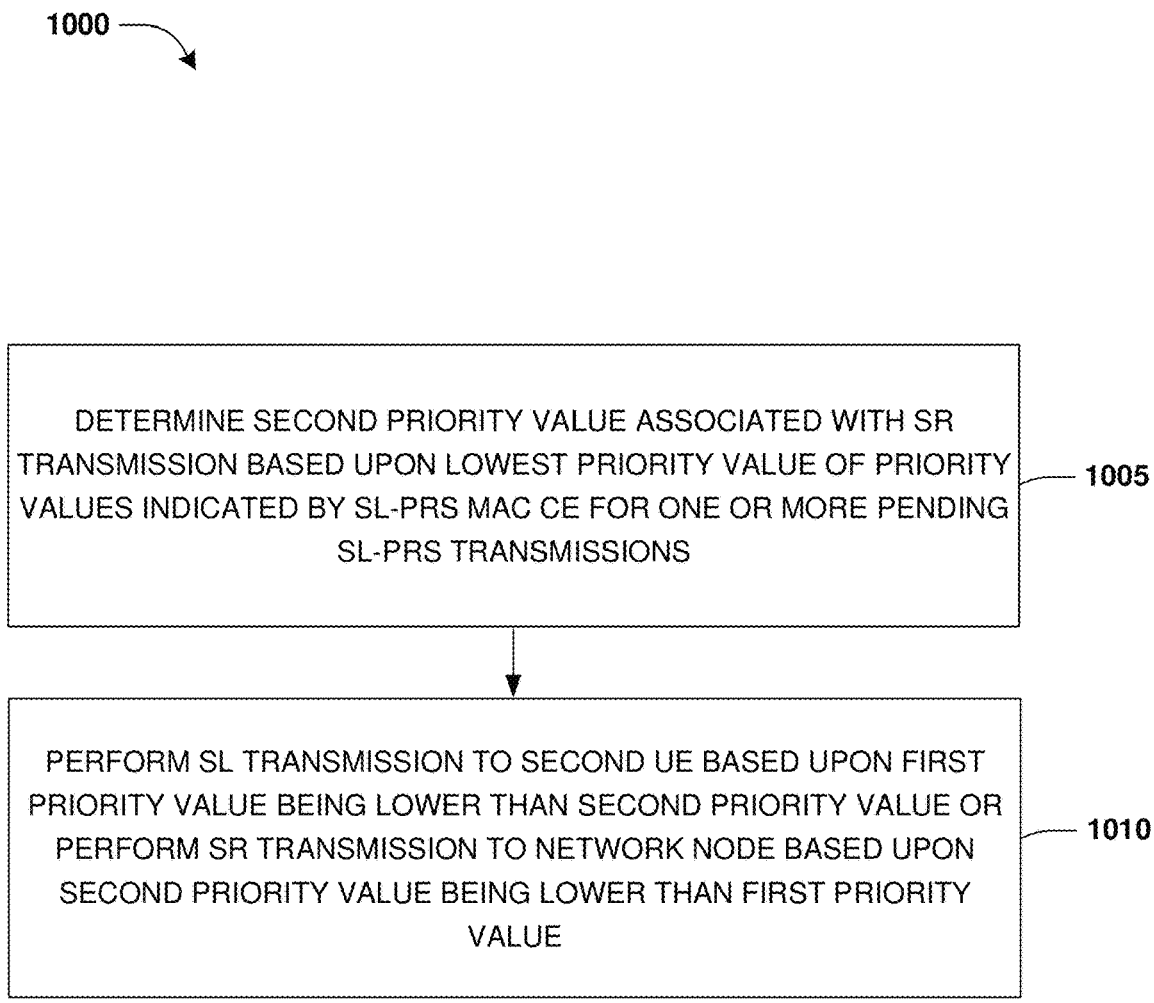
FIG. 10 is a flow chart according to one exemplary embodiment

FIG. 10 is a flow chart 1000 according to one exemplary embodiment from the perspective of a first UE not able to perform a SR transmission triggered by a SL-PRS resource request concurrently (and/or simultaneously) with a SL transmission associated with a first priority value, such as due, at least in part, to a configuration and/or capability of the first UE not allowing the first UE to concurrently (and/or simultaneously) perform the SL transmission and the SR transmission. In step 1005, the first UE determines a second priority value associated with the SR transmission based upon a lowest (e.g., minimum) priority value of priority values indicated by a SL-PRS Resource Request MAC CE for one or more pending SL-PRS transmissions. The lowest priority value may correspond to a highest priority of priorities indicated by the priority values indicated by the SL-PRS Resource Request MAC CE. The priority values may comprise all priority values indicated by the SL-PRS Resource Request MAC CE, and thus the lowest priority value (based upon which the second priority value is determined) may correspond to the lowest priority value indicated by the SL-PRS Resource Request MAC CE. In some examples, the second priority value may be set to be equal to the lowest priority value. At step 1010, the first UE performs the SL transmission to a second UE (e.g., a peer UE) based upon the first priority value being lower than the second priority value or performs the SR transmission to a network node (e.g., a base station, a gNB, etc.) based upon the second priority value being lower than the first priority value.

In some examples, the first UE determines the first priority value based upon a configuration (e.g., a RRC configuration) with which the first UE is configured and/or a type of the SL transmission. The type may be indicative of whether the SL transmission is a SL data transmission (on SL-SCH and/or PSSCH, for example), a SL-PRS transmission using a SL-PRS resource of a Shared SL-PRS resource pool, a SL-PRS transmission using a SL-PRS resource of a Dedicated SL-PRS resource pool, a transmission of a SL-CSI, or other type of SL transmission.

In one embodiment, the SL transmission is associated with a SL resource that overlaps with a Physical Uplink Control Channel (PUCCH) resource associated with the SR transmission. The first UE performs the SL transmission on the SL resource to the second UE (based upon the first priority value being lower than the second priority value) or performs the SR transmission on the PUCCH resource to the network node (based upon the second priority value being lower than the first priority value).

In one embodiment, the first UE is configured to perform the SL transmission and the SR transmission at non-overlapping times. For example, a configuration and/or capability of the first UE allows the first UE to perform the SL transmission and the SR transmission at non-overlapping times.

In one embodiment, the SL transmission comprises a SL data transmission.

In one embodiment, the SL transmission comprises a SL-PRS transmission associated with a dedicated SL-PRS resource pool. For example, the SL resource associated with the SL transmission may be a SL-PRS resource of the dedicated SL-PRS resource pool.

In one embodiment, the one or more pending SL-PRS transmissions comprise a plurality of pending SL-PRS transmissions, and the one or more priority values comprise a plurality of priority values associated with the plurality of pending SL-PRS transmissions. In some examples, the SL-PRS resource request MAC CE is generated to be indicative of the plurality of pending SL-PRS transmissions and the plurality of priority values. In some examples, the SL-PRS resource request MAC CE comprises a plurality of sets of information associated with the plurality of pending SL-PRS transmissions. In some examples, each set of information of the plurality of sets of information is indicative of a priority value (and/or other information) for a SL-PRS transmission of the plurality of pending SL-PRS transmissions.

In one embodiment, the SL-PRS resource request MAC CE is indicative of information associated with the one or more pending SL-PRS transmissions. For example, the SL-PRS resource request MAC CE may be used to provide the network node with information associated with the one or more pending SL-PRS transmissions (associated with one or more peer UEs).

In some examples, the first UE may identify a first pending SL-PRS transmission of the one or more pending SL-PRS transmissions. In some examples, the first pending SL-PRS transmission may be triggered by the first UE (e.g., by a higher and/or upper layer of the first UE). The SL-PRS resource request may be triggered (by the first UE, for example) in response to determining that the first pending SL-PRS transmission is pending (e.g., pending for transmission to one or more UEs). In some examples, the first UE may trigger the SR transmission in response to triggering the SL-PRS resource request and/or determining that the first pending SL-PRS transmission is pending. In some examples, after the first pending SL-PRS transmission is identified and/or the SL-PRS resource request is triggered, the first UE may identify a second pending SL-PRS transmission of the one or more SL-PRS transmissions. In some examples, the second pending SL-PRS transmission may be triggered by the first UE (e.g., by a higher and/or upper layer of the first UE). The SL-PRS resource request may be triggered (by the first UE, for example) in response to determining that the first pending SL-PRS transmission is pending (e.g., pending for transmission to one or more UEs). The first UE may generate the SL-PRS resource request MAC CE to be indicative of information associated with the first pending SL-PRS transmission to report to the network node (e.g., the information may comprise a priority value of the first pending SL-PRS transmission and/or one or more destination UEs of the first pending SL-PRS transmission), information associated with the second pending SL-PRS transmission to report to the network node (e.g., the information may comprise a priority value of the second pending SL-PRS transmission and/or one or more destination UEs of the second pending SL-PRS transmission), and/or information associated with one or more other pending SL-PRS transmissions to report to the network node.

Referring back to FIGS. 3 and 4, in one exemplary embodiment of a first UE, the device 300 includes a program code 312 stored in the memory 310. The CPU 308 may execute program code 312 to enable the first UE not able to perform a SR transmission triggered by a SL-PRS resource request concurrently with a SL transmission associated with a first priority value (i) to determine a second priority value associated with the SR transmission based upon a lowest priority value of priority values indicated by a SL-PRS Resource Request MAC CE for one or more pending SL-PRS transmissions, and (ii) to one of perform the SL transmission to a second UE (e.g., a peer UE) based upon the first priority value being lower than the second priority value or perform the SR transmission to a network node (e.g., a base station, a gNB, etc.) based upon the second priority value being lower than the first priority value. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 8-10. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 8-10, and/or one, some and/or all of the above-described actions and steps and/or others described herein.

It may be appreciated that applying one or more of the techniques presented herein may result in one or more benefits including, but not limited to, increased efficiency of communication between devices, more accurately prioritizing transmissions (e.g., SL-PRS transmissions and/or SR transmissions), positioning service requirements being met at an increased and/or more uniform rate, more accurate prioritization of SRs that are associated with and/or triggered by a plurality of SL-PRSs, improved transmission scheduling decisions in response to identification of potential collisions, etc.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first User Equipment (UE) not able to perform a Scheduling Request (SR) transmission triggered by a Sidelink Positioning Reference Signal (SL-PRS)

resource request concurrently with a Sidelink (SL) transmission associated with a first priority value, the method comprising:

determining a second priority value associated with the SR transmission based upon a lowest priority value of priority values indicated by a SL-PRS Resource Request Medium Access Control (MAC) Control Element (CE) for one or more pending SL-PRS transmissions; and one of:

performing the SL transmission to a second UE based upon the first priority value being lower than the second priority value; or performing the SR transmission to a network node based upon the second priority value being lower than the first priority value.

2. The method of claim 1, wherein:

the SL transmission is associated with a SL resource that overlaps with a Physical Uplink Control Channel (PUCCH) resource associated with the SR transmission; and one of:

performing the SL transmission to the second UE comprises performing the SL transmission on the SL resource; or performing the SR transmission to the network node comprises performing the SR transmission on the PUCCH resource.

3. The method of claim 1, wherein:

the SL transmission comprises a SL data transmission.

4. The method of claim 1, wherein:

the SL transmission comprises a SL-PRS transmission associated with a dedicated SL-PRS resource pool.

5. The method of claim 1, wherein:

the one or more pending SL-PRS transmissions comprise a plurality of pending SL-PRS transmissions;

the priority values comprise a plurality of priority values associated with the plurality of pending SL-PRS transmissions; and the method comprises generating the SL-PRS resource request MAC CE indicative of the plurality of pending SL-PRS transmissions and the plurality of priority values.

6. A non-transitory machine-readable medium having stored thereon processor-executable instructions, that when executed by a first User Equipment (UE), cause performance of operations, the operations comprising:

determining a first priority value associated with a Sidelink (SL) transmission to a second UE;

determining a second priority value associated with a Scheduling Request (SR) transmission to a network node based upon one or more priority values associated with one or more Sidelink Positioning Reference Signal (SL-PRS) transmissions associated with a SL-PRS resource request based upon which the SR transmission is triggered;

selecting, from among a plurality of transmissions comprising the SL transmission and the SR transmission, one of the SL transmission or the SR transmission based upon the first priority value and the second priority value; and performing the selected transmission.

7. The method non-transitory machine-readable medium of claim 6, wherein:

the SL transmission is associated with a SL resource that overlaps with a Physical Uplink Control Channel (PUCCH) resource associated with the SR transmission.

8. The non-transitory machine-readable medium of claim 7, wherein performing the selected transmission comprises:

performing the SL transmission on the SL resource in response to selecting the SL transmission from the plurality of transmissions; or performing the SR transmission on the PUCCH resource in response to selecting the SR transmission from the plurality of transmissions.

9. The non-transitory machine-readable medium of claim 6, wherein determining the second priority value associated with the SR transmission comprises:

analyzing the one or more priority values to identify a third priority value indicative of a highest priority among one or more priorities indicated by the one or more priority values; and determining the second priority value based upon the third priority value.

10. The non-transitory machine-readable medium of claim 6, wherein:

the first UE is configured to perform the SL transmission and the SR transmission at non-overlapping times.

11. The non-transitory machine-readable medium of claim 6, wherein:

at least one of a configuration or capability of the first UE does not allow the first UE to concurrently perform the SL transmission and the SR transmission.

12. The non-transitory machine-readable medium of claim 6, wherein:

the SL transmission comprises a SL data transmission.

13. The non-transitory machine-readable medium of claim 6, wherein:

the SL transmission comprises a SL-PRS transmission associated with a dedicated SL-PRS resource pool.

14. The non-transitory machine-readable medium of claim 6, wherein selecting one of the SL transmission or the SR transmission comprises:

selecting the SR transmission based upon the second priority value associated with the SR transmission being indicative of a higher priority compared to the first priority value associated with the SL transmission.

15. The non-transitory machine-readable medium of claim 6, wherein selecting one of the SL transmission or the SR transmission comprises:

selecting the SL transmission based upon the first priority value associated with the SL transmission being indicative of a higher priority compared to the second priority value associated with the SR transmission.

16. The non-transitory machine-readable medium of claim 6, wherein:

the one or more SL-PRS transmissions comprise a plurality of pending SL-PRS transmissions;

the one or more priority values comprise a plurality of priority values associated with the plurality of pending SL-PRS transmissions; and the method comprises generating a SL-PRS resource request MAC CE indicative of the plurality of pending SL-PRS transmissions and the plurality of priority values.

17. The non-transitory machine-readable medium of claim 6, comprising:
   generating a SL-PRS resource request MAC CE indicative of the one or more priority values.

18. The non-transitory machine-readable medium of claim 6, comprising:
   generating a SL-PRS resource request MAC CE indicative of information associated with the one or more SL-PRS transmissions.

19. A first User Equipment (UE) comprising:
   a control circuit;
   a processor installed in the control circuit; and
   a memory installed in the control circuit and operatively coupled to the processor, wherein the processor is configured to execute a program code stored in the memory to perform operations, the operations comprising:
      determining a first priority value associated with a first Sidelink (SL) transmission to a second UE;
      determining a second priority value associated with a Scheduling Request (SR) transmission to a network node based upon one or more priority values associated with one or more second SL transmissions associated with a SL resource request based upon which the SR transmission is triggered;
      selecting, from among a plurality of transmissions comprising the first SL transmission and the SR transmission, one of the first SL transmission or the SR transmission based upon the first priority value and the second priority value; and
      performing the selected transmission.

20. The first UE of claim 19, wherein determining the second priority value associated with the SR transmission comprises:
   analyzing the one or more priority values to identify a third priority value indicative of a highest priority among one or more priorities indicated by the one or more priority values; and
   determining the second priority value based upon the third priority value.

* * * * *